US009704315B2

(12) United States Patent
Fisher et al.

(10) Patent No.: US 9,704,315 B2
(45) Date of Patent: Jul. 11, 2017

(54) CONTEXTUAL DATA DELIVERY TO OTHER USERS AT AN ELECTRONIC LOCKBOX

(71) Applicant: SentriLock, LLC, Cincinnati, OH (US)

(72) Inventors: Scott R. Fisher, West Chester, OH (US); Marcus D. Adams, Cincinnati, OH (US); Robert A. Bollas, Cincinnati, OH (US); Steve L. Caupp, Blue Ash, OH (US); Connie F. Carver, Blue Ash, OH (US); Kyle T. Etgen, Franklin, OH (US); Christopher A. Hunt, West Chester, OH (US)

(73) Assignee: SentriLock, LLC, Cincinnati, OH (US)

( * ) Notice: Subject to any disclaimer, the term of this patent is extended or adjusted under 35 U.S.C. 154(b) by 111 days.

(21) Appl. No.: 14/737,166

(22) Filed: Jun. 11, 2015

(65) Prior Publication Data

US 2016/0364929 A1 Dec. 15, 2016

(51) Int. Cl.

| | |
|---|---|
| ***G05B 19/00*** | (2006.01) |
| ***G05B 23/00*** | (2006.01) |
| ***G06F 7/00*** | (2006.01) |
| ***G06F 7/04*** | (2006.01) |
| ***G06K 19/00*** | (2006.01) |
| ***G08B 29/00*** | (2006.01) |
| ***G08C 19/00*** | (2006.01) |
| ***H04B 1/00*** | (2006.01) |
| ***H04B 1/38*** | (2015.01) |
| ***H04B 3/00*** | (2006.01) |
| ***H04Q 1/00*** | (2006.01) |
| ***H04Q 9/00*** | (2006.01) |
| ***G07C 9/00*** | (2006.01) |

(52) U.S. Cl.
CPC .................... *G07C 9/00174* (2013.01); *G07C 2009/00769* (2013.01); *G07C 2209/62* (2013.01)

(58) Field of Classification Search
CPC .................. G07C 9/00174; G07C 2009/00769
USPC ........................................................ 340/5.61
See application file for complete search history.

(56) References Cited

U.S. PATENT DOCUMENTS

| | | | |
|---|---|---|---|
| 5,654,696 | A | 8/1997 | Barrett |
| 5,705,991 | A | 1/1998 | Kniffin |
| 6,822,553 | B1 | 11/2004 | Henderson |
| 6,842,105 | B1 | 1/2005 | Henderson |

(Continued)

OTHER PUBLICATIONS

ISA International Search Report (Sep. 9, 2016).

*Primary Examiner* — Tanmay Shah
(74) *Attorney, Agent, or Firm* — Frederick H. Gribbell

(57) ABSTRACT

An electronic lockbox system allows both sales agents and sales prospects to communicate either with the lockbox, or with the central clearinghouse computer. Contextual data then is provided to the sales prospect while the prospect is visiting a specific property that is the site of a lockbox installation. Both the agent and the prospect use smart devices, such as smart phones, that have both wide area network capability and low power radio capability. In other situations, contextual data can be sent to a user having a smart device, in which that contextual data pertains to at least one human occupant of the specific property where that lockbox has been installed, which can be useful where a medical caregiver arrives to visit a human occupant of a specific property that is protected by the electronic lockbox.

15 Claims, 18 Drawing Sheets

(56) References Cited

U.S. PATENT DOCUMENTS

| | | | | |
|---|---|---|---|---|
| 6,937,140 | B1 | 8/2005 | Outslay | |
| 7,177,819 | B2 | 2/2007 | Muncaster | |
| 7,606,558 | B2 | 10/2009 | Despain | |
| 7,880,584 | B2 | 2/2011 | Larson | |
| 8,040,218 | B2 | 10/2011 | Hays | |
| 2008/0246587 | A1 | 10/2008 | Fisher | |
| 2009/0153291 | A1 | 6/2009 | Larson | |
| 2011/0251876 | A1 | 10/2011 | Fisher | |
| 2013/0187756 | A1 * | 7/2013 | Fisher ................ | G07C 9/00571 340/5.61 |

* cited by examiner

CONTEXTUAL DATA DELIVERY TO OTHER USERS AT AN ELECTRONIC LOCKBOX

TECHNICAL FIELD

The technology disclosed herein relates generally to electronic locks and electronic lockbox systems and is particularly directed to a system of the type that includes a portable communications device (sometimes referred to herein as a mobile device, or a portable transponder) that communicates with an electronic lockbox using a low power radio link. Embodiments are specifically disclosed as a portable communications device that includes both a low power radio to communicate to the lockbox and a wide area network radio to communicate to a central clearinghouse computer, and optionally includes a Global Positioning System (GPS) receiver to determine approximate physical location of the lockbox when in communication with the lockbox.

In some disclosed embodiments, the portable transponder includes a motion sensor to activate its wide area network radio; also disclosed is a portable transponder that includes a smart card connector to communicate with a secure memory device.

A further embodiment is disclosed involving the portable communications device that communicates to an electronic lockbox using a low power radio and that communicates to a central clearinghouse computer using a wide area network radio; this portable communications device also provides a secondary computer to receive messages from the clearinghouse computer over the wide area network. In more advanced applications, the portable communications device can comprise a smart phone, which can run application software programs (called "APPS"), to customize the functions executed by the smart phone, and to allow certain information residing on the central computer to be displayed on the smart phone.

Embodiments are also disclosed as a system having an electronic lockbox that sends identifying data to the portable communications device via a low power radio and relays that data to the central clearinghouse computer, and generating a response from the central clearinghouse computer that contains one or more data elements with customized information of special interest to the user of the portable communications device. Such data elements can include information relating to the property to which the electronic lockbox is attached, and/or data relating to other similar properties in the geographic area. The data elements also could comprise configuration data relevant to the electronic lockbox, thereby updating the lockbox remotely and updating diagnostic data for the lockbox that allows near real time diagnostics from a support center located remote to the lockbox. Data from the central clearinghouse computer responsive to the lockbox being accessed also can be delivered to one more auxiliary portable communication devices, include such devices carried by individuals either in close proximity to the lockbox or at a remote location.

In another embodiment, an electronic lockbox system allows both sales agents and sales prospects to communicate either with the lockbox, or with the central clearinghouse computer. The ultimate goal is to provide contextual data to the sales prospect, and that contextual data can be sent in near-real time while the sales prospect is visiting a specific property that is the site of a lockbox installation. Both the sales agent and the sales prospect will use smart devices, such as smart phones, that have both wide area network capability and low power radio capability (such as Bluetooth), so that the sales prospect can communicate with either the central computer or the sales agent and receive the desired contextual data.

In still another embodiment of an electronic lockbox system, a user can arrive at a site where a lockbox has been installed and then receive contextual data pertaining to at least one human occupant of the specific property where that lockbox has been installed. This can be extremely useful for a situation where a medical caregiver arrives to visit one of the human occupants of a specific property that is protected by the electronic lockbox. The caregiver can communicate with the electronic lockbox using a short range wireless communications device (such as a smart device or a smart phone), and the caregiver can be provided with up to date medical information about the human occupant. The medical caregiver may or may not be authorized to open the lockbox secure compartment, and if that person is not authorized, then a second person would have to arrive who is authorized to obtain access to the secure compartment.

In this situation involving contextual data about a human occupant, the person arriving at the lockbox site could be an emergency responding agent (such as a police department officer or a fire department official), and in that situation that person's smart device could be provided with up to date contextual information about human occupants and perhaps other information pertaining to conditions on the building site itself that may not necessarily pertain directly to the human occupant. Such emergency personnel would likely have the capability of opening a lockbox in an emergency situation, so that person would be authorized to both receive the contextual data and to obtain access to the secure compartment of the lockbox. Other non-emergency personnel may also have reason to require contextual information about a human occupant of a lockbox property, including repair service persons or administrative service persons, and the like. Moreover, it is possible that the lockbox "site" could be a moving device such as a vehicle, particularly where the "site" could be an ambulance, or perhaps a mobile home.

STATEMENT REGARDING FEDERALLY SPONSORED RESEARCH OR DEVELOPMENT

None.

BACKGROUND

As wireless communication systems have become more prevalent, the ability to deliver relevant information to an end user in near real time is possible. With the vast amount of information being created and updated moment by moment, intelligent systems responsive to situational data needs are highly desirable. In the real estate industry for example, properties go on and off the market regularly, prices change, and surrounding similar properties may be of interest to a prospective home buyer.

In most real estate transactions, there are three to four parties involved in completing the transaction—the buyer, the seller, the buyer's agent or representative, and the seller's agent or representative. (Sometimes the two agents comprise a single person.) An event of showing a seller's property to a prospective buyer generates an electronic event at the lockbox, when one of the above mentioned agents accesses the lockbox to retrieve the key to the property. This access event itself identifies the buyer's interest in properties of a type similar to the property being visited, the geographic location of the property, and level of interest potentially inferred by the length of the visit. Access events recorded over time provide additional data relevant to general interest in the subject property, which may be reflective of price or property condition.

SUMMARY

Accordingly, it is an advantage to provide an electronic lockbox system in which data can be delivered to a user in real time, in which the user requests contextual data that is relevant to a particular geographic location of the lockbox that is being accessed by that user; the central computer searches its database for other relevant properties and creates a data set that is sent to the user in real time, so that the user can review the contextual data almost immediately, and also enables the user to discuss that contextual data with a sales prospect during a meeting that is occurring in real time.

It is another advantage to provide an electronic lockbox system that allows the central computer to identify a lockbox being accessed by a user who has an electronic key and is communicating with the central computer, essentially in real time; the central computer can determine if that lockbox has been associated with a particular property that is already stored in the database of the central computer, and if not, will query the user of the electronic key, asking for appropriate location information, which quickly updates the database of the central computer with up to date information about that lockbox and its associated property.

It is yet another advantage to provide an electronic lockbox system that allows the central computer to automatically match a sales agent with a sales prospect in near real time, by receiving messages from both persons that include GPS location data; if the central computer can correlate two separate messages with GPS location data and thereby match the locations of those two persons, the central computer can create a new entry in the database for this match and can record a visit to the property into a separate history database for later use.

It is still another advantage to provide an electronic lockbox system that allows a central computer to be accessed by sales agents and sales prospects, and to provide a history of previous property visits by such a sales agent or a sales prospect; both sales agents and sales prospects can access a special database in the central computer that allows such persons to view a history of their individual property visits and to review details of those property visits while, typically using the Internet for such access.

It is a further advantage to provide an electronic lockbox system that allows a user to obtain contextual data about a human occupant of a specific property that is protected by the lockbox, and if that user has sufficient authorization, to also obtain access to the secure compartment of that lockbox.

It is yet a further advantage to provide an electronic lockbox system that allows a sales agent to access a lockbox at a specific property, and then send access event information pertaining to that lockbox to a central clearinghouse computer using a wide area network communications device, and to allow a sales prospect to communicate a message in near-real time to the central computer in which that message contains GPS coordinates information that specifies an approximate physical location of the prospect's smart device; the central computer can then determine if the sales prospect is at a correct approximate physical position with respect to the lockbox, and if so, to then send a message to the sales prospect that contains contextual data relating to that property.

It is still a further advantage to provide an electronic lockbox system that allows a sales agent to login to the central computer using a wide area network communications circuit of the sales agent's smart device while the agent is visiting a lockbox, in which the agent smart device will obtain the identification code of the lockbox and send that to the central computer, and in near-real time, a sales prospect can also receive that lockbox's unique identification code and send that to the central computer using a wide area network communications circuit of the smart device of the sales prospect, after which the central computer will determine that both messages are from the same lockbox and within an appropriate time interval, and will send a message containing contextual data pertaining to that property to the sales prospect's smart device.

It is another advantage to provide an electronic lockbox system that allows an authorized user to visit a lockbox at a specific property such that a smart device for the sales agent will communicate with the electronic lockbox to receive the unique identification code of that lockbox using a short range wireless communications circuit, and for a sales prospect or other interested person having a second smart device can receive a wireless message directly from the sales agent pertaining to that lockbox property, and have contextual data for that specific property transferred from the first smart device of the agent to the second smart device of the second person, and then to have that contextual information displayed on the second smart device.

It is yet another advantage to provide an electronic lockbox system in which a sales prospect who is not authorized to access a secure compartment of an electronic lockbox in the system can communicate with the central computer using a login procedure, after which the sales prospect can request a visit history report pertaining to property visits for one or more of the properties in the electronic lockbox system, and after validation at the central computer, the central computer will send contextual data pertaining to the specific property or properties included in the visit history report and will send that information to the portable smart device of the sales prospect using a wide area network circuit, and after the contextual information message has been received at the prospect's smart device, the APP running on that prospect's smart device will determine if existing contextual data is resident for at least one of the properties of interest, and if so the existing contextual data will be updated on the prospect's smart device.

Additional advantages and other novel features will be set forth in part in the description that follows and in part will become apparent to those skilled in the art upon examination of the following or may be learned with the practice of the technology disclosed herein.

To achieve the foregoing and other advantages, and in accordance with one aspect, a method for operating an electronic lockbox system is provided, in which the method comprises the following steps: (a) providing an electronic lockbox having a first processing circuit, a first memory circuit, a first short range wireless communications circuit, and a secure compartment having a movable opening element that is under the control of the first processing circuit; (b) providing at least one portable communications device, including a first portable communications device of the at least one portable communications device, the first portable communications device having a second processing circuit, a second memory circuit, a display, a data entry device, a second short range wireless communications circuit, and a first WAN communications circuit for communicating with a wide area network; (c) providing a central computer having a third processing circuit, a third memory circuit containing at least one database, and a second WAN communications circuit for communicating with the wide area network; (d) in response to a communication event occurring between the electronic lockbox and the first portable communications device, sending, by use of the first WAN communications circuit, an indication of such communication event to the central computer; (e) at the central computer, assimilating a data set of contextually relevant information relating to a property to which the lockbox is assigned; and (f) sending, by use of the second WAN communications circuit, at least one data element from the data set to the at least one portable communications device.

In accordance with another aspect, an electronic lockbox system is provided, which comprises: (a) an electronic lockbox having a first processing circuit, a first memory circuit, a first short range wireless communications circuit, and a secure compartment having a movable opening element that is under the control of the first processing circuit; (b) at least one portable communications device, including a first portable communications device of the at least one portable communications device, the first portable communications device having a second processing circuit, a second memory circuit, a display, a data entry device, a second short range wireless communications circuit, and a first WAN communications circuit for communicating with a wide area network; and (c) a central computer having a third processing circuit, a third memory circuit containing at least one database, and a second WAN communications circuit for communicating with the wide area network; wherein the first, second, and third processing circuits are configured: (d) in response to a communication event occurring between the electronic lockbox and the first portable communications device, to send, by use of the first WAN communications circuit, an indication of such communication event to the central computer; (e) at the central computer, to assimilate a data set of contextually relevant information relating to a property to which the lockbox is assigned; and (f) to send, by use of the second WAN communications circuit, at least one data element from the data set to the at least one portable communications device.

In accordance with yet another aspect, a method for operating an electronic lockbox system is provided, in which the method comprises the following steps: (a) providing an electronic lockbox having a first processing circuit, a first memory circuit, a first short range wireless communications circuit, and a secure compartment having a movable opening element that is under the control of the first processing circuit; (b) providing a plurality of portable communications devices, including a first portable communications device of the plurality of portable communications devices, the first portable communications device having a second processing circuit, a second memory circuit, a display, a data entry device, a GPS receiver, a second short range wireless communications circuit, and a first WAN communications circuit for communicating with a wide area network; (c) providing a central computer having a third processing circuit, a third memory circuit containing at least one database, and a second WAN communications circuit for communicating with the wide area network; (d) establishing a first database in the third memory circuit of the central computer, the first database used for containing relationship information between agents and prospects; (e) sending, using the first WAN communications circuit, a message from the first portable communications device to the central computer, the message including GPS location data; and (f) updating the first database in the central computer, based on a proximal GPS location of the first portable communications device substantially at a time when the first portable communications device communicates with the electronic lockbox.

In accordance with still another aspect, an electronic lockbox system is provided, which comprises: (a) an electronic lockbox having a first processing circuit, a first memory circuit, a first short range wireless communications circuit, and a secure compartment having a movable opening element that is under the control of the first processing circuit; (b) a plurality of portable communications devices, including a first portable communications device of the plurality of portable communications devices, the first portable communications device having a second processing circuit, a second memory circuit, a display, a data entry device, a GPS receiver, a second short range wireless communications circuit, and a first WAN communications circuit for communicating with a wide area network; and (c) a central computer having a third processing circuit, a third memory circuit containing at least one database, and a second WAN communications circuit for communicating with the wide area network; wherein the first, second, and third processing circuits are configured: (d) to establish a first database in the third memory circuit of the central computer, the first database used for containing relationship information between agents and prospects; (e) to send, using the first WAN communications circuit, a message from the first portable communications device to the central computer, the message including GPS location data; and (f) to update the first database in the central computer, based on a proximal GPS location of the first portable communications device substantially at a time when the first portable communications device communicates with the electronic lockbox.

In accordance with a further aspect, a method for operating an electronic lockbox system is provided, in which the method comprises the following steps: (a) providing an electronic lockbox having a first processing circuit, a first memory circuit, a first short range wireless communications circuit, and a secure compartment having a movable opening element that is under the control of the first processing circuit; (b) providing at least one portable communications device, including a first portable communications device of the at least one portable communications device, the first portable communications device having a second processing circuit, a second memory circuit, a display, a data entry device, a second short range wireless communications circuit, and a first WAN communications circuit for communicating with a wide area network; (c) providing a central computer having a third processing circuit, a third memory circuit containing at least one database, and a second WAN communications circuit for communicating with the wide area network, and a network server; (d) interacting with the electronic lockbox by the first portable communications device, by using the first and second short range wireless communications circuits; (e) sending a message from the first portable communications device to the central computer, using the first and second WAN communications circuits, informing the central computer of the interaction between the electronic lockbox and the first portable communications device; (f) at the central computer, identifying the electronic lockbox that was interacted with by a user of the first portable communications device; and (g) at the central computer, determining if the identified lockbox is associated with a property in the at least one database of the central computer, and if not so associated, then: (h) querying the user of the first portable communications device for at least one of: an address, and a location, of the electronic lockbox.

In accordance with a yet further aspect, an electronic lockbox system is provided, which comprises: (a) an electronic lockbox having a first processing circuit, a first memory circuit, a first short range wireless communications circuit, and a secure compartment having a movable opening element that is under the control of the first processing circuit; (b) at least one portable communications device, including a first portable communications device of the at least one portable communications device, the first portable communications device having a second processing circuit, a second memory circuit, a display, a data entry device, a second short range wireless communications circuit, and a first WAN communications circuit for communicating with a wide area network; and (c) a central computer having a third processing circuit, a third memory circuit containing at least one database, and a second WAN communications circuit for communicating with the wide area network, and a network server; wherein the first, second, and third processing circuits are configured: (d) to interact with the electronic lockbox by the first portable communications device, by using the first and second short range wireless communications circuits; (e) to send a message from the first portable communications device to the central computer, using the first and second WAN communications circuits, informing the central computer of the interaction between the electronic lockbox and the first portable communications device; (f) at the central computer, to identify the electronic lockbox that was interacted with by a user of the first portable communications device; and (g) at the central computer, to determine if the identified lockbox is associated with a property in the at least one database of the central computer, and if not so associated, then: (h) to query the user of the first portable communications device for at least one of: an address, and a location, of the electronic lockbox.

In accordance with a still further aspect, a method for operating an electronic lockbox system is provided, in which the method comprises the following steps: (a) providing a plurality of electronic lockboxes, including a first electronic lockbox of the plurality of electronic lockboxes, the first electronic lockbox having a first processing circuit, a first memory circuit, and a secure compartment having a movable opening element that is under the control of the first processing circuit; (b) providing at least one portable communications device, including a first portable communications device of the at least one portable communications device, the first portable communications device having a second processing circuit, a second memory circuit, a display, a data entry device, and a first WAN communications circuit for communicating with a wide area network; and (c) providing a central computer having a third processing circuit, a third memory circuit containing at least one database, and a second WAN communications circuit for communicating with the wide area network, wherein the at least one database includes a first database having a plurality of entries that record information about visits to at least one property in the electronic lockbox system; (d) sending login message information from the first portable communications device to the central computer; (e) at the central computer, determining if the login message information is correct, and if so, allowing a user of the first portable communications device to obtain access to predetermined portions of the at least one database; (f) upon request by the user, sending a history of at least one property visit at the plurality of electronic lockboxes involving the user, from the central computer to the first portable communications device, and displaying the history on the display of the first portable communications device; (g) allowing the user, by use of the data entry device of the first portable communications device, to select one of the property visits from the history of at least one property visit, and sending that selection to the central computer; and (h) sending relevant information about the selected property visit from the central computer to the first portable communications device.

In accordance with yet another aspect, an electronic lockbox system is provided, which comprises: (a) a plurality of electronic lockboxes, including a first electronic lockbox of the plurality of electronic lockboxes, the first electronic lockbox having a first processing circuit, a first memory circuit, and a secure compartment having a movable opening element that is under the control of the first processing circuit; (b) at least one portable communications device, including a first portable communications device of the at least one portable communications device, the first portable communications device having a second processing circuit, a second memory circuit, a display, a data entry device, and a first WAN communications circuit for communicating with a wide area network; and (c) a central computer having a third processing circuit, a third memory circuit containing at least one database, and a second WAN communications circuit for communicating with the wide area network, wherein the at least one database includes a first database having a plurality of entries that record information about visits to at least one property in the electronic lockbox system; wherein the first, second, and third processing circuits are configured: (d) to send login message information from the first portable communications device to the central computer; (e) at the central computer, to determine if the login message information is correct, and if so, to allow a user of the first portable communications device to obtain access to predetermined portions of the at least one database; (f) upon request by the user, to send a history of at least one property visit at the plurality of electronic lockboxes involving the user, from the central computer to the first portable communications device, and to display the history on the display of the first portable communications device; (g) to allow the user, by use of the data entry device of the first portable communications device, to select one of the property visits from the history of at least one property visit, and then to send that selection to the central computer; and (h) to send relevant information about the selected property visit from the central computer to the first portable communications device.

In accordance with another aspect, an electronic lockbox system is provided, which comprises: (a) at least one electronic lockbox, the at least one electronic lockbox having a first processing circuit, a first memory circuit, a first short range wireless communications circuit, and a secure compartment having a movable opening element that is under the control of the first processing circuit, wherein the at least one electronic lockbox is assigned to a specific property; and (b) at least one portable communications device, the at least one portable communications device having a second processing circuit, a second memory circuit, a display, a data entry circuit, and a second short range wireless communications circuit; (c) wherein the first and second processing circuits are programmed with computer code to perform functions of: (i) activating the at least one electronic lockbox by an action performed by a person; (ii) using the first short range wireless communications circuit of the at least one electronic lockbox to send a first message containing contextual data pertaining to at least one human occupant of the specific property; and (iii) after receiving the first message at the second short range wireless communications circuit of the at least one portable communications device, generating visual information on the display, wherein the visual information pertains to the at least one human occupant of the specific property.

In accordance with yet another aspect, an electronic lockbox system is provided, which comprises: (a) a first electronic lockbox, the first electronic lockbox having a first processing circuit, a first memory circuit, a first short range wireless communications circuit, and a secure compartment having a movable opening element that is under the control of the first processing circuit, wherein the first electronic lockbox is assigned to a first specific property; (b) a first portable communications device having a second processing circuit, a second memory circuit, a first display, a first data entry circuit, a second short range wireless communications circuit, and a first WAN communications circuit for communicating with a wide area network, the first portable communications device being assigned to a sales agent; (c) a central computer having a third processing circuit, a third memory circuit containing at least one database, and a second WAN communications circuit for communicating with the wide area network, wherein the at least one database includes a first database having a plurality of entries that store contextual data pertaining to at least one property in the electronic lockbox system; and (d) a second portable communications device having a fourth processing circuit, a fourth memory circuit, a second display, a second data entry circuit, a GPS receiver circuit, and a third WAN communications circuit for communicating with a wide area network, the second portable communications device being assigned to a sales prospect; wherein the first, second, third, and fourth processing circuits are programmed with computer code to perform functions of: (i) at the first electronic lockbox, granting access to the secure compartment if a sales agent correctly performs an authorized access procedure; (ii) at the first electronic lockbox, using the first short range wireless communications circuit and the second short range wireless communications circuit, sending a first message that is received by the first portable communications device, the first message containing access event information pertaining to the first electronic lockbox; (iii) at the first portable communications device, using the first WAN communications circuit and the second WAN communications circuit, sending a second message that is received by the central computer, the second message containing access event information pertaining to the first electronic lockbox; (iv) at the second portable communications device, using the third WAN communications circuit and the second WAN communications circuit, sending a third message that is received by the central computer, the third message containing GPS coordinates information that specifies an approximate physical location of the second portable communications device; (v) at the central computer, determining if the approximate physical location of the second portable communications device corresponds to a physical location of the first electronic lockbox, and if so, then; (vi) at the central computer, using the second WAN communications circuit and the third WAN communications circuit, sending a fourth message that is received by the second portable communications device, the fourth message containing contextual data pertaining to the first specific property.

In accordance with still another aspect, an electronic lockbox system is provided, which comprises: (a) a first electronic lockbox, the first electronic lockbox having a first processing circuit, a first memory circuit, a first short range wireless communications circuit, and a secure compartment having a movable opening element that is under the control of the first processing circuit, wherein the first electronic lockbox is assigned to a first specific property; (b) a first portable communications device having a second processing circuit, a second memory circuit, a first display, a first data entry circuit, a second short range wireless communications circuit, and a first WAN communications circuit for communicating with a wide area network, the first portable communications device being assigned to a sales agent; (c) a central computer having a third processing circuit, a third memory circuit containing at least one database, and a second WAN communications circuit for communicating with the wide area network, wherein the at least one database includes a first database having a plurality of entries that store contextual data pertaining to at least one property in the electronic lockbox system; and (d) a second portable communications device having a fourth processing circuit, a fourth memory circuit, a second display, a second data entry circuit, a third short range wireless communications circuit, and a third WAN communications circuit for communicating with a wide area network, the second portable communications device being assigned to a sales prospect; wherein the first, second, third, and fourth processing circuits are programmed with computer code to perform functions of: (i) activating the first electronic lockbox by an action performed by at least one of: (A) the sales agent and (B) the sales prospect; (ii) using the first short range wireless communications circuit of the first electronic lockbox, sending a first message containing first unique identification information pertaining to the first electronic lockbox; (iii) at the first portable communications device, allowing the sales agent to login to the central computer, using the first WAN communications circuit and the second WAN communications circuit; (iv) after receiving the first message at the second short range wireless communications circuit of the first portable communications device, using the first WAN communications circuit and the second WAN communications circuit to send a second message to the central computer, the second message containing the first unique identification information pertaining to the first electronic lockbox and identification information pertaining to the sales agent; (v) after receiving the first message at the third short range wireless communications circuit of the second portable communications device, using the third WAN communications circuit and the second WAN communications circuit to send a third message to the central computer, the third message containing the first unique identification information pertaining to the first electronic lockbox; (vi) after receiving the second and third messages at the central computer, using the second WAN communications circuit and the third WAN communications circuit to send a fourth message to the second portable communications device, the fourth message containing contextual data pertaining to the first specific property.

In accordance with a further aspect, an electronic lockbox system is provided, which comprises: (a) a first electronic lockbox, the first electronic lockbox having a first processing circuit, a first memory circuit, a first short range wireless communications circuit, and a secure compartment having a movable opening element that is under the control of the first processing circuit, wherein the first electronic lockbox is assigned to a first specific property; (b) a first portable communications device having a second processing circuit, a second memory circuit, a first display, a first data entry circuit, a second short range wireless communications circuit, and a first WAN communications circuit for communicating with a wide area network, the first portable communications device being assigned to an authorized user; (c) a central computer having a third processing circuit, a third memory circuit containing at least one database, and a second WAN communications circuit for communicating with the wide area network, wherein the at least one database includes a first database having a plurality of entries that store contextual data pertaining to at least one property in the electronic lockbox system; and (d) a second portable communications device having a fourth processing circuit, a fourth memory circuit, a second display, a second data entry circuit, a third short range wireless communications circuit, and a third WAN communications circuit for communicating with a wide area network, the second portable communications device being assigned to a second person; wherein the first, second, and fourth processing circuits are programmed with computer code to perform functions of: (i) activating the at least one electronic lockbox by an action performed by at least one of: (A) the authorized user and (B) the second person; (ii) at the first electronic lockbox, using the first short range wireless communications circuit and the second short range wireless communications circuit, sending a first message that is received by the first portable communications device, the first message containing first unique identification information pertaining to the first electronic lockbox; (iii) at the first portable communications device, using the second short range wireless communications circuit and the third short range wireless communications circuit, and based upon the first unique identification information, sending a second message that is received by the second portable communications device, the second message containing contextual data pertaining to the first specific property; and (iv) at the second portable communications device, after receiving the second message, then generating visual information on the second display, wherein the visual information pertains to the first specific property.

In accordance with a yet further aspect, an electronic lockbox system is provided, which comprises: (a) a plurality of electronic lockboxes, at least two of the electronic lockboxes having a first processing circuit, a first memory circuit, a first short range wireless communications circuit, and a secure compartment having a movable opening element that is under the control of the first processing circuit, wherein a first one of the plurality of electronic lockboxes is assigned to a first specific property, and wherein a second one of the plurality of electronic lockboxes is assigned to a second specific property; (b) a first portable communications device having a second processing circuit, a second memory circuit, a first display, a first data entry circuit, a second short range wireless communications circuit, and a first WAN communications circuit for communicating with a wide area network, the first portable communications device being assigned to a sales prospect who is not authorized to access a secure compartment of the plurality of electronic lockboxes; (c) a central computer having a third processing circuit, a third memory circuit containing at least one database, and a second WAN communications circuit for communicating with the wide area network, wherein the at least one database includes a first database having a plurality of entries that store visit history reports and contextual data pertaining to properties in the electronic lockbox system, including at least the first specific property and the second specific property; wherein the first, second, and third processing circuits are programmed with computer code to perform functions of: (i) at the first portable communications device, allowing the sales prospect to login to the central computer, using the first WAN communications circuit and the second WAN communications circuit; (ii) at the first portable communications device, allowing the sales prospect to request a visit history report pertaining to property visits for at least one of the first specific property and the second specific property; (iii) at the central computer, sending a visit history report pertaining to property visit activities of the sales prospect, and sending current contextual data pertaining to the specific properties included in the visit history report to the first portable communications device, using the second WAN communications circuit and the first WAN communications circuit; (iv) at the first portable communications device, storing the current contextual data received from the central computer in the second memory circuit; (v) at the first portable communications device, determining if existing contextual data is resident in the second memory circuit for at least one of the first specific property and the second specific property, and if so, then: (vi) at the first portable communications device, updating the existing contextual data for the at least one of the first specific property and the second specific property.

Still other advantages will become apparent to those skilled in this art from the following description and drawings wherein there is described and shown a preferred embodiment in one of the best modes contemplated for carrying out the technology. As will be realized, the technology disclosed herein is capable of other different embodiments, and its several details are capable of modification in various, obvious aspects all without departing from its principles. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the technology disclosed herein, and together with the description and claims serve to explain the principles of the technology. In the drawings:

DETAILED DESCRIPTION

Figure 1:
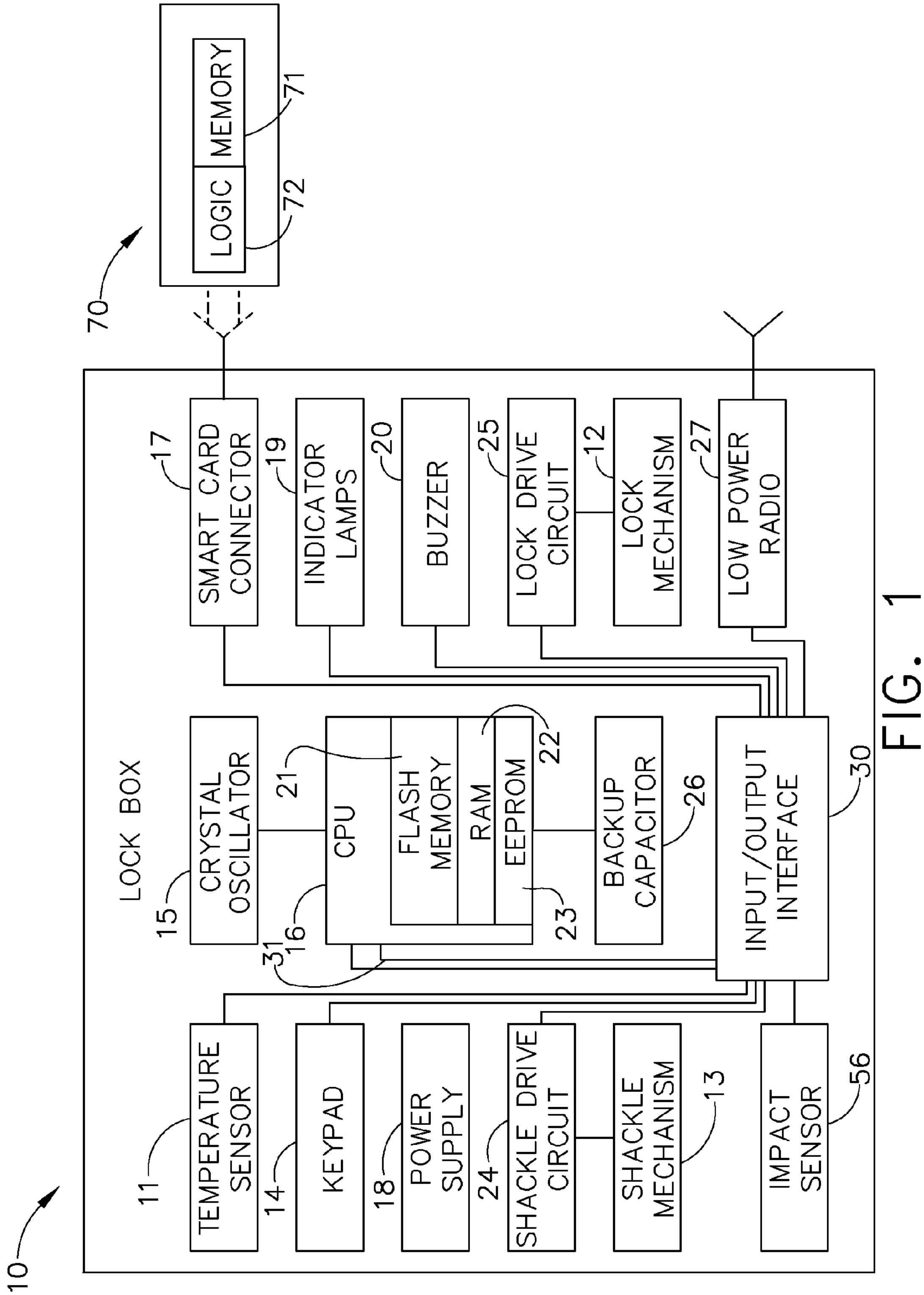
FIG. 1 is a schematic block diagram of the electrical components of an electronic lockbox, as constructed according to the principles of the technology disclosed herein.

Reference will now be made in detail to the present preferred embodiment, an example of which is illustrated in the accompanying drawings, wherein like numerals indicate the same elements throughout the views.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

The terms "first" and "second" preceding an element name, e.g., first inlet, second inlet, etc., are used for identification purposes to distinguish between similar or related elements, results or concepts, and are not intended to necessarily imply order, nor are the terms "first" and "second" intended to preclude the inclusion of additional similar or related elements, results or concepts, unless otherwise indicated.

In addition, it should be understood that embodiments disclosed herein include both hardware and electronic components or modules that, for purposes of discussion, may be illustrated and described as if the majority of the components were implemented solely in hardware.

However, one of ordinary skill in the art, and based on a reading of this detailed description, would recognize that, in at least one embodiment, the electronic based aspects of the technology disclosed herein may be implemented in software. As such, it should be noted that a plurality of hardware and software-based devices, as well as a plurality of different structural components may be utilized to implement the technology disclosed herein.

It will be understood that the term "circuit" as used herein can represent an actual electronic circuit, such as an integrated circuit chip (or a portion thereof), or it can represent a function that is performed by a processing device, such as a microprocessor or an ASIC that includes a logic state machine or another form of processing element (including a sequential processing device). A specific type of circuit could be an analog circuit or a digital circuit of some type, although such a circuit possibly could be implemented in software by a logic state machine or a sequential processor. In other words, if a processing circuit is used to perform a desired function used in the technology disclosed herein (such as a demodulation function), then there might not be a specific "circuit" that could be called a "demodulation circuit;" however, there would be a demodulation "function" that is performed by the software. All of these possibilities are contemplated by the inventors, and are within the principles of the technology when discussing a "circuit."

The system described herein provides near real time delivery of relevant information on properties to which the lockbox is attached and those that may be of reasonable interest to the user. The automated delivery of this information saves substantial time for the user as well as data transmission cost since a lengthy process of searching for the relevant information on-line is not as fast as the central clearinghouse computer actively sending contextual information based on situational data relayed from the user. In addition, data delivered to more than one information consumer may be desirable. For example, an individual looking to purchase a home may wish to receive information on the property visited that may not be readily available on site when visiting the property, such as property tax information. Additionally, that prospective home buyer may wish to have additional data delivered for similar properties in the area such that a more efficient physical search for homes may be performed. Yet another desirable feature is to automatically track visited properties and display those locations on a map. Home buyers would also benefit from knowing the level of interest in a subject property based on visits; home sellers also could use visit information in the context of comparable properties to better understand barriers to sale, such as price, curb appeal, or amenities. Automation of these tasks provides convenience for all of the parties in the transaction.

This system also enables data delivered to the seller's smart phone to be uploaded into the lockbox, thereby enabling a listing agent to effect changes to lockbox settings remotely when the seller is in close proximity to the lockbox.

The system in some embodiments utilizes information garnered from a GPS receiver associated with either the lockbox or the portable communication device, wherein GPS specifies general global positioning information regardless of the actual methodology or system used to ascertain geographic position.

This description will begin with an overview description of some of the features of the technology disclosed herein. It should be noted that a co-pending patent application by the same inventor is incorporated by reference herein; that document is application Ser. No. 12/883,628, filed on Sep. 16, 2010, titled "ELECTRONIC LOCK BOX PROXIMITY ACCESS CONTROL," which describes in detail many of the hardware elements of this system. In addition, another co-pending patent application by the same inventor is incorporated by reference herein; that document is application Ser. No. 13/830,024, filed on Mar. 14, 2013, titled "CONTEXTUAL DATA DELIVERY TO MOBILE USERS RESPONSIVE TO ACCESS OF AN ELECTRONIC LOCKBOX," which describes some of the operational features of an earlier version of a contextual data delivery system.

Setup

Each user in the system installs application software (known as an "APP") on their portable communications device (e.g., a portable transponder, electronic key, or a smart phone that includes a GPS receiver, or other type of mobile device) that communicates with the central clearing house computer (CCC) over the wide area network (WAN). The application (APP) identifies itself to the CCC via user login credentials and can remain active on the user's portable communication device to receive notifications and data from the CCC in near real time (assuming the portable device is in communication range with a cellular tower, or other type of communications node). The application on the portable communication device relies on GPS information to determine when it is appropriate to send data to the user's device based on the activity of the user's agent or representative. Most real estate agents have multiple clients, therefore the CCC must be able to track which client the agent is working with at the time to send the proper data to users of the system. In the case of seller's agents being matched with sellers, the system utilizes the location of the lockbox, whether pre-assigned by the seller's agent in the CCC database or by GPS information collected through accesses of one or more buyers agents. For buyer's agents, the CCC identifies both the buyer's agent and the buyer by matching their respective GPS locations and times corresponding to access events at the lockbox. That is, the buyer would obviously be present at the physical location with the buyer's agent during the process of a home showing; therefore, both would have GPS locations that are proximally close to one another. The method of relationship identification discussed above requires little if any user intervention. It should be noted that one or more buyers or sellers can be automatically associated with their respective representative, e.g., a husband and wife desiring data notifications responsive to events at the lockbox. Once the relationship is determined by the CCC, future data can be pushed to multiple portable communication devices even if only one participant is present at the showing.

Buyer Relevant Data Communication Responsive to Lockbox Events

At the time of lockbox access, the portable communication device receives the identity of the lockbox being accessed via the low power radio link and augments this information with GPS location data provided either by the lockbox itself or by the portable communication device. If the portable communication device is within communication range of the wide area network (WAN), the access event data is relayed to the central clearinghouse computer (CCC). Software resident on the CCC computer system identifies the real estate listing information based on a pre-assigned lockbox serial number corresponding to the listing or by using the GPS coordinates communicated as part of the transmission. Once the subject property is identified, attributes about the subject property, such as price range, neighborhood, number of bedrooms, approximate square footage, are known by the system and can be attributed to a specific buyer for further processing. The activity of the buyer visiting the subject property is stored in the CCC to automatically maintain a record of which properties have been visited. Data messages corresponding to duplicate visits are identified by the CCC and filtered, so as not to send redundant contextual information to the buyer.

The CCC then evaluates other properties in its database to identify other potential properties in a specific geographic range that have similar characteristics to the subject property. Without user intervention, the CCC assembles a data set of desirable like properties and transmits them to the portable communication device as quickly as possible. The software application (APP) on the portable communication device displays this information in near real time, thereby allowing the buyer to identify other properties in the area that may be of interest as well as a map of properties already visited. The application (APP) on the portable communication device allows the buyer to see listing information on the CCC-generated list of properties and to mark off properties which are not of interest. Status changes on desirability entered by the buyer are communicated back to the CCC, so the database maintained of buyer preferences and activity is updated.

It should be noted that any relevant contextual data can be sent to the portable communication device. Such data could include: property tax information, EPA hazardous waste sites, school district information, local merchant information, advertising or other special offers, and the like.

Another feature of the system includes storing photos or videos taken by the buyer or their agent of the subject property; such data can be stored on the CCC for future reference. This is especially useful when a large number of properties are visited and it becomes difficult to remember which property had specific attributes.

Buyer's Agent Relevant Data Communication Responsive to Lockbox Events

The information sets described above are also useful to the buyer's agent, and delivery of such information can occur nearly simultaneously on multiple portable communication devices carried by the buyer and the buyer's agent.

At the time of access, the buyer's agent can benefit from real time contextual information about the listing. Such information includes, for example, alarm system information such as a disarm code that should not be generally shared, even with the buyer; and other important information such as "dog locked in garage;" these are examples of such time sensitive information. Certain of these messages are critical in nature and should not be disregarded by the buyer's agent. To prevent accidentally ignoring these messages, an alert can be generated by the lockbox or by the portable communication device indicating such a message is present. As an insurance step, these messages can be flagged such that, for example, an additional code is required at the lockbox, or an acknowledgement of the message is made on the smart phone prior to enabling lockbox access.

Another feature simplifying the management of real estate clients is providing a feature by which the buyer's agent has a software application (an "APP") that receives information for tracking which exact properties have been visited by the client (e.g., a "buyer"), as well as additional information relating to other prospective properties in the area that may be of interest to the buyer.

Seller Relevant Data Communication Responsive to Lockbox Events

Property sellers are usually lacking in terms of real time updates and feedback during the sale of their property. Events triggered by accessing the lockbox on the seller's property, coupled with neighborhood statistical data on like property accesses, can be of great benefit to the seller. The automated nature of this reporting lessens the burden on the listing agent, as the seller is kept notified throughout the sales process.

As described above, at the time of lockbox access, the portable communication device receives the identity of the lockbox being accessed via the low power radio link, and augments this information with GPS location data provided either by the lockbox itself or by the portable communication device. If the portable communication device is within communication range of a wide area network (WAN), the access event data is quickly relayed to the central clearing house computer (CCC). Software resident on the CCC computer system identifies the real estate listing information based a on pre-assigned lockbox serial number corresponding to the listing, or by using the GPS coordinates that are communicated as part of the transmission.

The CCC then evaluates the other properties in its database to identify other properties in a specific geographic range that have similar characteristics to the seller's property. Without user intervention, the CCC assembles a data set of statistics regarding access to the list of like properties, and transmits that information to the portable communication device, as requested by the user of the portable communication device. The software application (the "APP") on the portable communication device displays this information in near real time, allowing the seller to understand the relative showing activity in the surrounding area for similar properties.

Other data that would benefit the seller, relating to lockbox access, may include showing event start, showing completion, access of the lockbox by a minor or other family member through a "latchkey" mode on the lockbox, and notification if the key was not returned to the lockbox. Some of these features are more fully taught in earlier patent application Ser. No. 12/883,628 and U.S. Pat. No. 7,999,656, by the present inventor, which are incorporated herein by reference in their entirety—see below.

Crowd Sourced Lockbox to Property Database Linkage

Given the high reliance on identifying which lockbox is attached to a specific property, a method of using multiple input sources to correlate the identity of the lockbox on the property is desired. In situations where the seller's agent fails to assign the lockbox serial number in the CCC database, which would identify which lockbox is assigned to a specific property, a "crowd sourced" approach may be used to effect assignment. In that circumstance, during an access event to a specific lockbox that has not yet been assigned to a property listing in the CCC database, each portable communication device user (e.g., a buyer's agent) would receive a message from the CCC requesting the street address information for the property being shown. The buyer's agent would be required to answer the query, otherwise his/her portable communication device would be restricted from interacting with future lockboxes until the query is answered. The CCC would store the responses and statistically correlate such responses where matches occur, thereby allowing the CCC to identify the property to which the lockbox is assigned.

Lockbox Settings Update Via Seller's Portable Communication Device

There are occasions in which the seller or seller's agent needs to modify the settings of the lockbox. For example, a "pending" sale contract status may make it desirable to lock out further showings by prospective buyer's agents. Such updating of the lockbox traditionally required the seller's agent to visit the property to effect a change in settings for that lockbox. This is often inconvenient and somewhat costly, depending on the distance the seller's agent must travel, plus it does not provide the potential immediate needs of the seller. The system described herein allows the seller's agent, or an authorized representative, to place data in the CCC that is transferred to the seller's portable communication device. The seller can then initiate communication between the lockbox and his/her portable communication device such that the lockbox receives data relating to the new settings. This data stream can include a command that changes the status setting, for example.

Central Clearinghouse Computer

Terminology herein relating to the central clearinghouse computer (CCC) should be understood to encompass one or more physical computers, either together at a single location, or computers that are geographically diverse but that work in concert with one another, to store, retrieve, and otherwise process information relevant to operation of the "system." In today's computing parlance, "the cloud" is one possible representation of a computing platform equivalent to that carried out by the CCC in this disclosure. In this technical field, the CCC is sometimes referred to herein as a "central computer" or a "clearinghouse computer."

The CCC will include memory storage devices that can hold one or more databases of information; usually one of the databases is updated with new information almost every time a sales agent or a sales prospect communicates with the CCC, under the control of the operating software of the CCC itself. In some applications, as described below, a new database is "started" in the memory of the CCC by certain types of communications and transactions that are initiated by a sales agent or prospect. In many descriptions of this type of equipment, the "database" of the CCC actually represents multiple individual database structures, when viewed from a computer science standpoint—and these are often "relational databases" at that. However, the existence of several database structures is still referred to as a singular tense "database" at times, even though it is understood that a single huge database really comprises more than one type of store of information at the CCC.

As noted above, the secondary computer device (or the portable communications device) would typically be a wireless device, such as a smart phone. It also could be a wireless laptop computer, if desired by the user. In some embodiments, this device may include a GPS receiver, as described below in greater detail.

Referring now to the drawings, FIG. 1 illustrates an exemplary embodiment of an electronic lockbox generally designated by the reference numeral 10, which is suitable for use with the technology disclosed herein. Lockbox 10 has an outer housing, which includes a keypad 14 (see FIG. 2), and the housing includes a movable key compartment door 32 (see FIG. 2). The upper housing of lockbox 10 includes two receptacles (not shown) that receive a shackle 40 (see FIG. 2). The shackle 40 has an upper portion 46 and two shackle extensions (not visible in FIG. 2) that fit through the receptacles. It should be noted that the keypad 14 may also be referred to as a "data input device," in which a human user may press one or more of the keys to enter data, such as numeric information.

The electronic circuitry of electronic lockbox 10 is illustrated in block diagram form in FIG. 1. In this illustrated embodiment, electronic lockbox 10 includes a microprocessor (CPU) 16, FLASH memory 21, random access memory (RAM) 22, EEPROM (electrically erasable programmable read only memory) 23, a battery (or other electrical power supply) 18, a memory backup capacitor 26, an ISO-7816 smart card connector 17, indicator LED lamps 19, a piezo buzzer 20, a crystal oscillator 15, a digital temperature sensor 11 (these last two devices can be combined into a single chip), a shackle drive circuit 24, a shackle release mechanism 13, a key compartment mechanism drive circuit 25, a key compartment lock/release mechanism 12, and a membrane style keypad 14 for user data entry. An impact sensor 56 can also be included in electronic lockbox 10, to detect abnormal mechanical forces that might be applied to the device.

An input/output (I/O) interface circuit 30 is included to provide signal conditioning as needed between the CPU 16 and other components that typically use voltage and/or current levels that are not typically able to hook up directly to a processing device, such as sensors and output device driver circuits. Each appropriate I/O signal is directed through a separate channel of the I/O interface circuit 30, unless perhaps more than one signal of a particular voltage and current rating can be multiplexed, in which case a multiplexer circuit can be included in the I/O interface circuit 30. The data signals between I/O circuit 30 and the CPU 16 run through a low voltage signal bus 31.

A data interface in the form of a low power radio 27 is included in this embodiment so that the CPU 16 is able to communicate with other external devices, such as a separate portable transponder 100 (see FIG. 2) that uses a compatible wireless data link. (The portable transponder can also be referred to as a "mobile device," a "portable communications device," an "electronic key," or a "smart phone" in some embodiments of this technology.) The portable transponder 100 also includes a low power radio 127, which communicates with radio 27 using a protocol that could be proprietary, if desired. However, the radios 27 and 127 could use any number of various communications protocols, such as BlueTooth, although the data structure in the messages between radios 27 and 127 certainly could be encrypted, or otherwise formatted in a proprietary manner. Radios 27 and 127 further could comprise other types of wireless communications devices that may not operate on a strictly radio principle, including types of wireless communications devices that have not been invented as of yet. In this description, such wireless communications devices will typically be referred to as "radios;" however, in this patent document they may also be referred to as a "short range wireless communications device," or a "low power wireless communications device."

Microprocessor 16 controls the operation of the electronic lockbox 10 according to programmed instructions (electronic lockbox control software) stored in a memory device, such as in FLASH memory 21. RAM memory 22 is typically used to store various data elements such as counters, software variables and other informational data. EEPROM memory 23 is typically used to store more permanent electronic lockbox data such as serial number, configuration information, and other important data. It will be understood that many different types of microprocessors or microcontrollers could be used in the electronic lockbox system 10, and that many different types of memory devices could be used to store data in both volatile and non-volatile form, without departing from the principles disclosed herein. In one mode of an exemplary embodiment, the electronic lockbox CPU 16 is an 8-bit Atmel Mega8 microcontroller that incorporates RAM 22, FLASH memory 21 and EEPROM memory 23 internally (as on-board memory).

Battery 18 provides the operating electrical power for the electronic lockbox. Capacitor 26 is used to provide temporary memory retention power during replacement of battery 18. It will be understood that an alternative electrical power supply could be used if desired, such as a solar panel with the memory backup capacitor.

As noted above, electronic lockbox 10 includes a shackle 40 that is typically used to attach the box 10 to a door handle or other fixed object. Electronic lockbox 10 also includes a key compartment which typically holds a dwelling key (not shown), and which can be accessed via the key access door 32 (which is also referred to herein as a "controlled access member").

The key compartment lock and release mechanism 12 uses a gear motor mechanism (not shown) that is controlled by drive circuit 25 that in turn is controlled by CPU 16. Shackle release mechanism 13 also uses a gear motor, which is controlled by drive circuit 24 that in turn is controlled by CPU 16. It will be understood that the release or locking mechanisms used for the shackle 40 and key compartment 32 can be constructed of many different types of mechanical or electromechanical devices without departing from the principles disclosed herein.

The crystal oscillator 15 provides a steady or near-constant frequency (e.g., at 32.768 kHz) clock signal to CPU 16's asynchronous timer logic circuit. The ISO-7816 smart card connector 17 connects to electrical contacts on a "smart card" 70 to allow the exchange of data between the electronic lockbox's CPU 26 and memory devices 71 in the smart card 70 (discussed below in greater detail). The smart card 70 itself typically will include some control logic circuits 72, to prevent "easy" or unauthorized access to the memory elements 71 on-board the card 70.

It should be noted that an electronic key (such as that described above) could be used as a type of secure memory device for the element at reference numeral 70, rather that a classic "smart card." Such an electronic key would also contain memory elements 71, and perhaps would contain some control logic circuits 72, although the control logic circuits might be optional, depending on the type of electronic key device that is used. With regard to FIG. 1, if an electronic key is used, it could be interfaced to the CPU circuit 16 of the electronic lockbox 10 is many different ways, including via an electrical circuit that makes contact between the lockbox 10 and the electronic key 70 (similar to that depicted on FIG. 1), or perhaps via an electromagnetic signal such as a short range radio wave, or an optical signal. As used herein, the term "electronic key" can have a meaning to include a relatively simple device, such as a secure memory card (or a "smart card"), and it can have a meaning to include a sophisticated device, such as a laptop computer or a smart phone that has a wireless communications circuit to send and receive messages from other devices, including an electronic lockbox and/or a central clearinghouse computer. A "typical" electronic key will generally be a more sophisticated device.

In one embodiment, the digital temperature sensor 11 is read at regular intervals by the electronic lockbox CPU 16 to determine the ambient temperature. Crystal oscillator 15 may exhibit a small change in oscillating characteristics as its ambient temperature changes. In one type of crystal oscillator device, the oscillation frequency drift follows a known parabolic curve around a 25 degrees C. center. The temperature measurements are used by CPU 16 in calculating the drift of crystal 15 and thus compensating for the drift and allowing precise timing measurement regardless of electronic lockbox operating environment temperature. As noted above, a single chip can be used to replace the combination of crystal oscillator 15 and temperature sensor 11, such as a part number DS32KHZ manufactured by Dallas Semiconductor.

The LED indicator lamps 19 and piezo buzzer 20 are included to provide both an audible and a visual feedback of operational status of the electronic lockbox 10. Their specific uses are described in detail in other patent documents by the same inventor, as noted below.

The impact sensor 56 can be used to notify an external device, in case of an attempted removal or other type of damage being done to the lockbox 10, including intentional damage. Such an external device could comprise a "base station" as described in detail in other patent documents by the same inventor, or it could comprise the portable transponder 100 that is described herein.

Backup capacitor 26 is charged by battery 18 (or perhaps by another power source) during normal operation. Capacitor 26 serves two functions, the first of which is to maintain adequate voltage to CPU 16 during either shackle drive circuit activation, or lock drive circuit activation. In an exemplary embodiment, capacitor 26 is charged from the regulated side of voltage regulator in power supply 18, whereas all electromechanical drive current is derived from the unregulated side of power supply 18. Capacitor 26 also maintains a stable voltage to CPU 16 during periods of high current drain on power supply 18. The second function of capacitor 26 is to maintain CPU 16 operation and RAM memory 22 during a period when the battery 18 is replaced.

Figure 2:
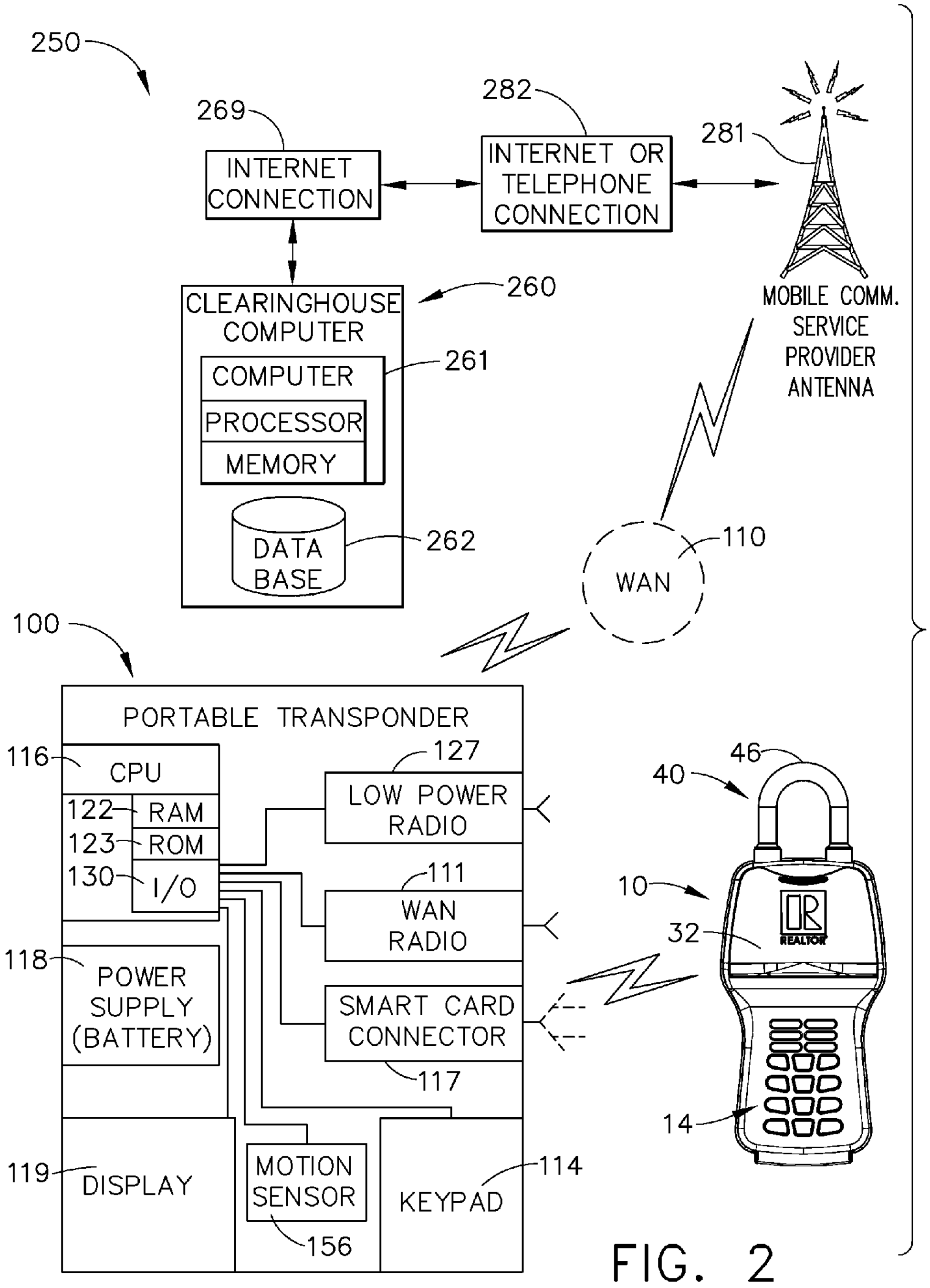
FIG. 2 is a diagrammatic view of the major components of a first embodiment of an electronic lockbox security system, including a central computer station, a wireless portable transponder device, and a portable electronic lockbox apparatus such as that depicted in FIG. 1.

Referring now to FIG. 2, a first embodiment electronic lockbox system, generally designated by the reference numeral 250, is depicted. The system 250 includes one or more electronic lockboxes 10, perhaps one or more secure memory cards (not shown on FIG. 2), portable transponder devices 100, a central clearinghouse computer system 260 (also sometimes referred to herein as a "CCC"), and a wireless data communications system, represented by Internet® connections 269 and 282, and a mobile phone provider 281. The central clearinghouse computer 260 typically will include a database 262 which contains a repository of electronic lockbox identification and attribute information, and also contains a repository of information about real estate agents. A computer 261 controls the database 262, and includes a processing circuit and a memory circuit (in addition to any bulk memory storage devices that contain the database 262).

Referring again to FIG. 2, an electronic lockbox system of a first embodiment is depicted in a diagrammatic view. An electronic lockbox 10 is depicted in the lower-right corner of FIG. 2, and is shown communicating to a portable transponder 100. As discussed above, portable transponder 100 includes a low power radio 127 that can communicate data to and from the low power radio 27 of the electronic lockbox 10. Some of the other components of the portable transponder 100 are depicted on FIG. 2.

In this embodiment, portable transponder 100 includes a microprocessor (CPU) 116, random access memory (RAM) 122, read only memory (ROM) 123, and an input/output interface circuit 130. There are several devices that are in communication with the input/output (I/O) circuit 130, as discussed immediately below.

The low power radio 127 communicates data to and from the CPU 116, via the I/O circuit 130. A wide area network (WAN) radio 111 is provided, and it also communicates data to and from the CPU 116, via the I/O interface circuit 130. Portable transponder 100 also includes a smart card connector 117, which is essentially identical to the smart card connector 17 that is provided on the electronic lockbox 10. Portable transponder 100 also includes a display 119, a keypad 114, a power supply 118 (typically a battery), and a motion sensor 156. The motion sensor 156 provides additional capability for the portable transponder 100, as discussed in greater detail below.

Because of its wide area network radio 111, portable transponder 100 is able to communicate to the clearinghouse computer 260 over a wide area network (WAN), which is generally designated by the reference numeral 110. Assuming that the mobile communications service provider 281 is a cellular telephone system, the portable transponder 100 will have the capability of essentially immediate communications with the clearinghouse computer 260 from many, many locations, including most locations where an electronic lockbox 10 has been situated. On the other hand, if a particular electronic lockbox 10 is located in a very remote area, where there is no cellular telephone connection coverage, then the wide area network 110 therefore would not reach that location, and the portable transponder 100 would not be in immediate communication with the clearinghouse computer 260. This situation will be discussed below in greater detail.

The wide area network radio 111 further could comprise other types of wireless communications devices that may not operate on a strictly radio principle, including types of wireless communications devices that have not been invented as of yet. In this description, such wireless communications devices are sometimes referred to as "radios;" however, in this patent document they may also be referred to as a "wide area network wireless communications device," or as a "medium range wireless communications device."

In a preferred mode of the first embodiment depicted on FIG. 2, the portable transponder 100 includes a connector 117 that is capable of accepting a secure memory card (such as a "smart card"), so that a user who typically connects his or her secure memory card directly to an electronic lockbox 10 will also be able to connect the same secure memory card to the portable transponder 100, and have much the same results. This will be described in greater detail below. Note that the smart card connector can also be referred to as a "data interface" that communicates with a "secure memory device"—a "smart card" is an example of a secure memory device.

The first radio circuit of the portable transponder is the low power radio 127 such as Atmel's AT86RF23x series that uses a low power radio frequency signal. The portable transponder also includes a second radio circuit which is capable of longer range communications for wide area network connectivity, such as Wavecom's WISMO22x series. In a preferred embodiment, the CPU 116 will comprise a low power microcontroller, and a relatively low power visual display 119 will be provided to allow indication of operating status. The motion sensor 156 is to be included as an internal motion sensor that is coupled to the microcontroller (CPU 116). Its capability and use is described below.

The low power communications circuit in the lockbox (e.g. low power radio 27) provides sufficient range to enable proximal communications with a portable transponder 100 that is carried by the lockbox system user. The built in wide area communication radio of the transponder (e.g., WAN radio 111), such as radios used by a cellular carrier, enables a host of other system features. One desirable feature of this arrangement is for individuals who access an electronic lockbox to be unencumbered with other devices. For example, real estate agents often have their hands full when approaching a lockbox, and such an agent that is equipped with a portable transponder 100 can enter a personal identification code on the keypad 114 of the portable transponder 100. It should be noted that the keypad 114 may also be referred to as a "data input device," in which a user (e.g., a sales "agent") may press one or more of the keys to enter data, such as numeric information.

Such an agent could initially use the portable transponder and its keypad while remaining in a vehicle, for example, and inserting their secure memory card into the connector 117 of the portable transponder 100. In this mode, the agent can prepare his or her portable transponder to be ready to communicate his or her personal identification code from the transponder 100 to the lockbox 10 over the low power radio link (between radios 127 and 27), and the electronic lockbox will interpret that radio signal to allow access to the key compartment door 32. In this manner, the lockbox radio system retrieves data from the portable transponder 100 to facilitate access to the dwelling key that is contained within the secure compartment of the electronic lockbox 10.

In another operating mode, a secure memory card that is connected to smart card connector 117 of the portable transponder 100 can have data read from the memory elements of the secure memory card 70 that is connected to the portable transponder 100, and have that data sent to the electronic lockbox over the low power radio link, thereby having the secure memory card's data "read" by the electronic lockbox CPU 16. Furthermore, if it is desirable to write data onto the memory elements 71 of a secure memory card 70, that function can occur while the secure memory card is connected to the smart card connector 117 of the portable transponder 100, by having the low power radio 27 of the electronic lockbox 10 transfer data to the portable transponder 100, and the CPU 116 can then write data onto the secure memory card, via the smart card connector 117. This could be accomplished to write the same types of data that would otherwise be written directly by the lockbox 10 to the secure memory card 70 as it is connected into the smart card connector 17 of the lockbox itself.

The use of secure memory cards offer many advantages with the electronic lockbox system for access to the lockbox, which is well documented in previous patents and patent applications filed by the same inventor of this patent document. To further enhance security, the lockbox can use data that the portable transponder 100 has retrieved over its wide area radio system (i.e., the WAN 110), such as the current (real time) decryption key for use with the secure memory card. If the portable transponder loses contact with the central clearinghouse computer system 260, or if the secure memory card is either lost or stolen, the decryption key update credentials of the portable transponder can be revoked at the central clearinghouse computer, thereby disabling further access to lockboxes by that secure memory card.

Figure 3:
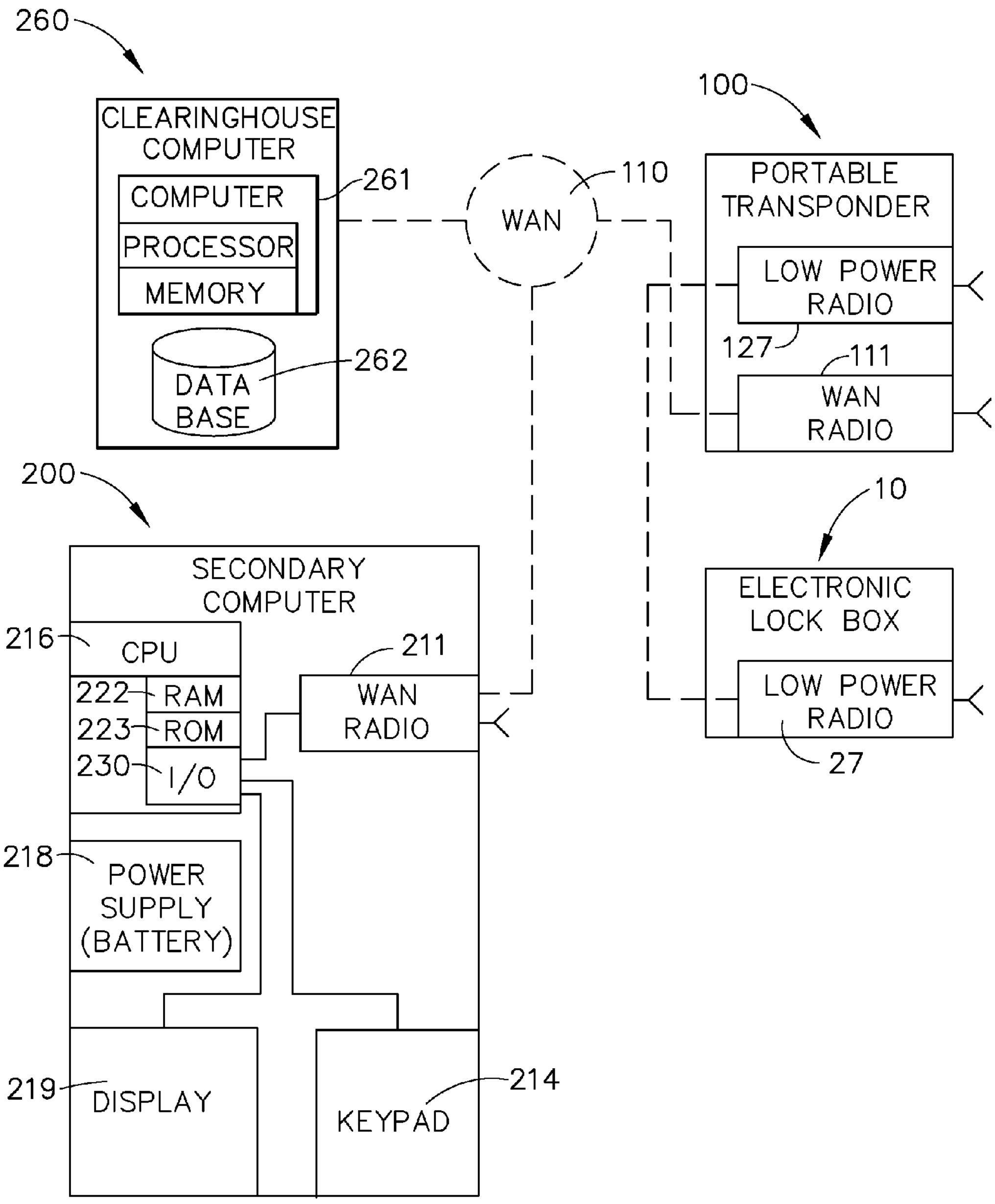
FIG. 3 is a diagrammatic view of the major components of a second embodiment of an electronic lockbox security system, including a central computer station, a wireless portable transponder device, a wireless portable secondary computer, and a portable electronic lockbox apparatus such as that depicted in FIG. 1.

FIG. 3 illustrates a second embodiment of an electronic lockbox system that includes the central clearinghouse computer 260, one or more portable transponders 100, and one or more electronic lockboxes 10. The system of FIG. 3 also includes a wide area network 110 that could use a standard cellular telephone service, if desired.

The clearinghouse computer 260 includes a computer 261 with a processor and memory, and also includes a database 262 to hold access event data as well as a myriad of other types of information used by the electronic lockbox system. The portable transponder 100 again includes a low power radio 127 and a wide area network radio 111. The electronic lockbox 10 again includes a low power radio 27, which communicates with the transponder's low power radio 127.

The second embodiment system of FIG. 3 includes an additional component, which is listed thereon as "secondary computer" 200. Secondary computer 200 includes a microprocessor (CPU) 216, and this computer (or processing circuit) also is coupled to random access memory 222, read only memory 223, and an input/output interface circuit 230. The secondary computer 200 also includes a display 219, a keypad 214, a power supply 218 (typically a battery), and a wide area network (WAN) radio 211. The WAN radio 211 can also be placed in communication with the wide area network 110, and therefore, can communicate with the clearinghouse computer 260 or the portable transponder 100 as desired.

As described above, the secondary computer 200 could be constructed as a standard commercial device, such as a wireless laptop computer, or an Internet-compatible cellular telephone (or "smart phone"), for example.

Lockbox with Wireless Communications to an Electronic Key

Figure 4:
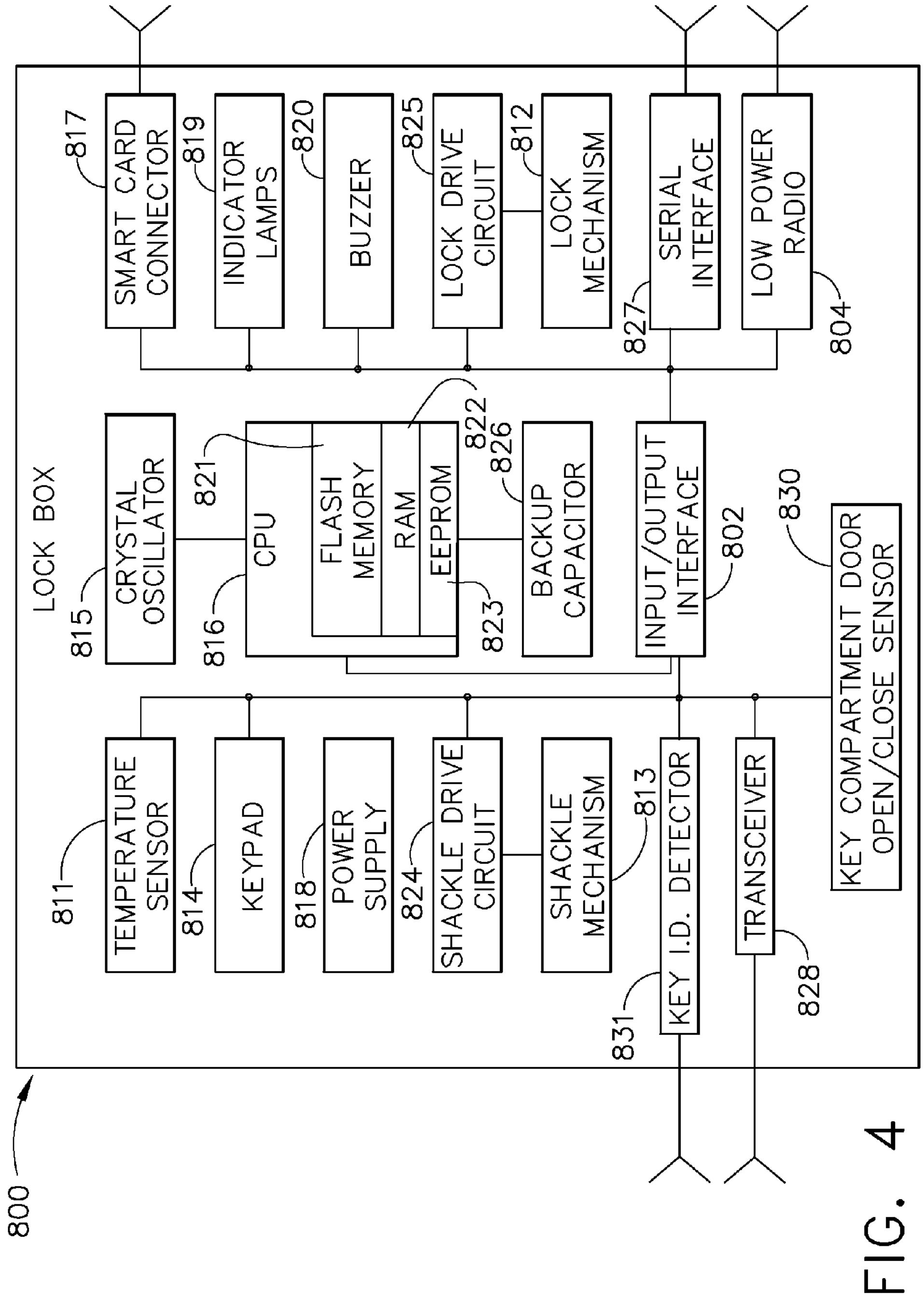
FIG. 4 is a block diagram showing some of the major hardware components of an electronic lockbox that communicates with a wireless portable electronic key, such as a "smart phone," and that also communicates with an identification device, such as an RFID transceiver circuit, as constructed according to the principles of the technology disclosed herein.

An alternative lockbox design is provided in FIG. 4, which shows many of the major electronic components, generally designated by the reference numeral 800, in a block diagram. Most of the components listed in this block diagram are also found in the earlier versions of an electronic lockbox sold by SentriLock, LLC of Cincinnati, Ohio. A brief description of these components follows:

Electronic lockbox 800 includes a microprocessor (CPU) 816, FLASH memory 821, random access memory (RAM) 822, EEPROM (electrically erasable programmable read only memory) 823, a battery (or other electrical power supply) 818, a memory backup capacitor 826, an ISO-7816 smart card connector 817, indicator LED lamps 819, a piezo buzzer 820, a crystal oscillator 815, a digital temperature sensor 811 (these last two devices can be combined into a single chip) a shackle drive circuit 824, a shackle release mechanism 813, a key compartment mechanism drive circuit 825, a key compartment lock/release mechanism 812, and a membrane style keypad 814 for user data entry.

A serial interface 827 is also included so that the CPU 16 is able to communicate with other external devices, such as a separate portable computer in the form of a PDA (personal digital assistant) or other type of portable computing device that uses a serial data link. For example, serial interface 827 can comprise in infrared (IR) port that communicates with a standard IR port found on many PDAs; or it could use a different communications protocol, such as BlueTooth. A low power radio 804 is included for communications with a portable electronic key (not shown on FIG. 4). This radio 804 could have any number of types of communications protocols, including one that allows the lockbox 800 to exchange data with an electronic key in the form of a smart phone. A special software application program (an "APP") would run on the smart phone, to allow it to communicate with lockbox 800.

Microprocessor 816 controls the operation of the electronic lockbox 800 according to programmed instructions (electronic lockbox control software) stored in a memory device, such as in FLASH memory 821. RAM memory 822 is typically used to store various data elements such as counters, software variables and other informational data. EEPROM memory 823 is typically used to store more permanent electronic lockbox data such as serial number, configuration information, and other important data. It will be understood that many different types of microprocessors or microcontrollers could be used in the electronic lockbox 800, and that many different types of memory devices could be used to store data in both volatile and non-volatile form, without departing from the principles of this technology. In one mode of an exemplary embodiment, the electronic lockbox CPU 816 is an 8-bit Atmel Mega8 microcontroller that incorporates RAM 822, FLASH memory 821 and EEPROM memory 823 internally (as on-board memory).

Battery 818 provides the operating electrical power for the electronic lockbox. Capacitor 826 is used to provide temporary memory retention power during replacement of battery 818. It will be understood that an alternative electrical power supply could be used if desired, such as a solar panel with the memory backup capacitor.

An input/output (I/O) interface circuit 802 is provided so the microprocessor 816 can exchange data and operational signals with external devices, or with integral devices to the lockbox that require greater power than can be directly supplied by the microprocessor's pinouts. This puts the I/O circuit 802 in the pathway for virtually all signals that are used in the controlling of lockbox 800, including the data signals that are involved with the serial interface 827, the smart card connector 817, and the low power radio 804.

Electronic lockbox 800 generally includes a shackle (see item 946 on FIG. 5) that is typically used to attach the lockbox 800 to a door handle or other fixed object. However, it should be noted that stationary versions of these electronic lockboxes are now available that are permanently affixed to buildings, or other large object, and such stationary versions do not require shackles. One such stationary lockbox is illustrated in FIG. 6—see description below.

Figure 5:
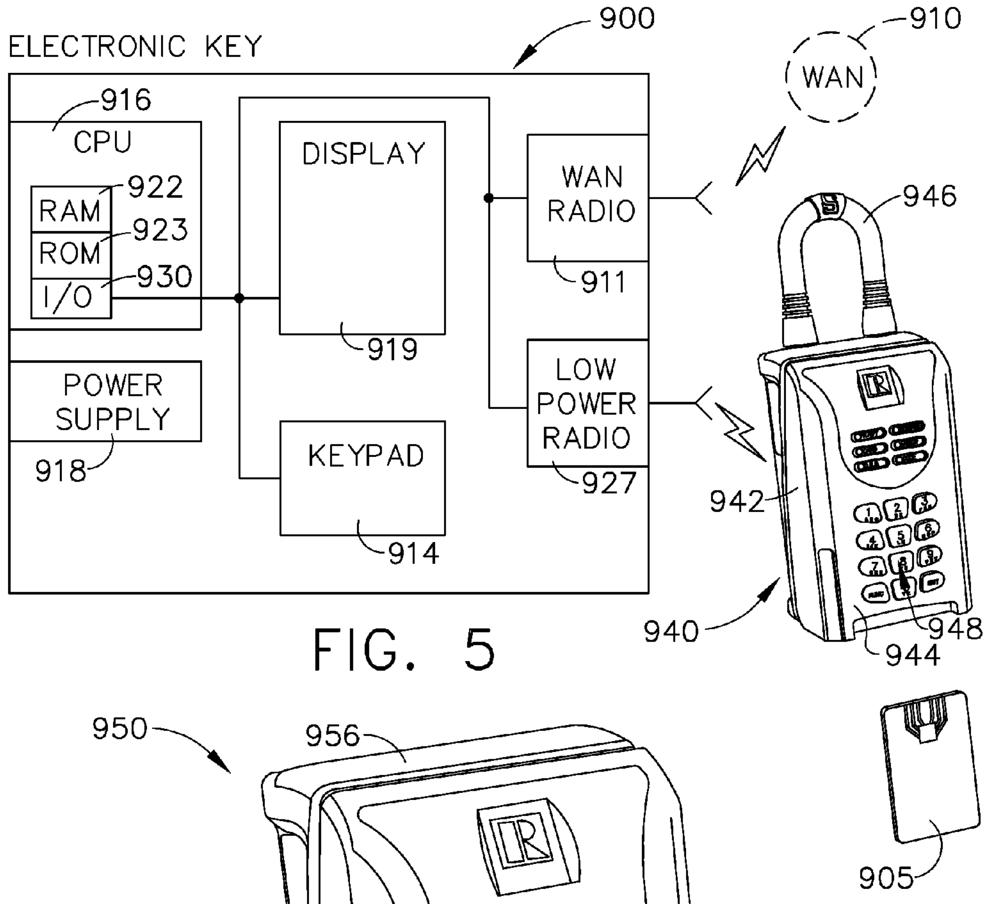
FIG. 5 is a block diagram showing some of the major hardware components of a portable electronic key that is capable of wireless communication with one of the electronic lockboxes of FIG. 1 or FIG. 4, for example, and that is capable of wireless communication with a wide area network, such as a cellular telephone system.
Figure 6:
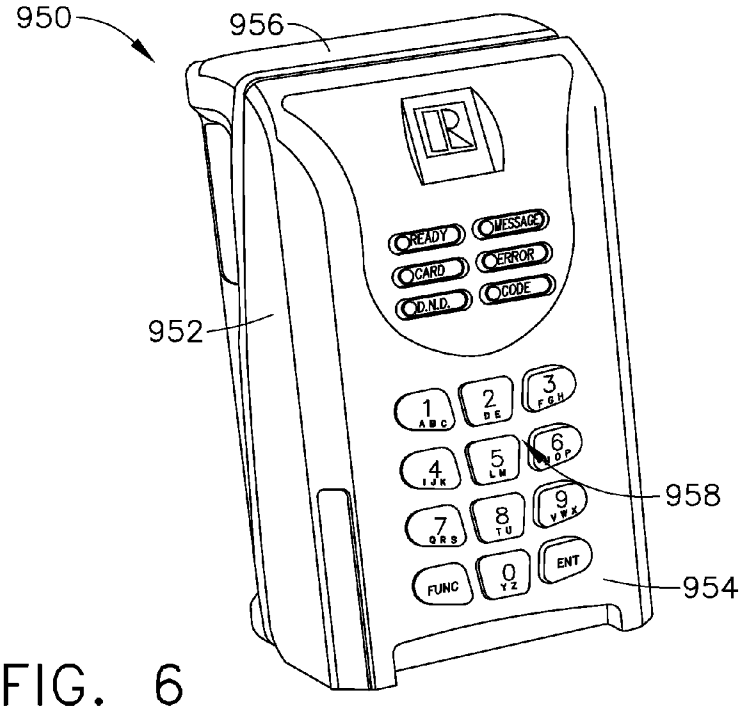
FIG. 6 is a perspective view of a stationary electronic lockbox, which includes the hardware components that are depicted in FIG. 1 or FIG. 4, for example.

Electronic lockbox 800 also includes a key compartment which typically holds a dwelling key (not shown), and which can be accessed via a key access door 32 (see FIG. 2), or a key access door 944 (see FIG. 5). Note that the structure called a "key access door" is also sometimes referred to herein as a "controlled access member." The key compartment's lock and release mechanism 812 uses a motor mechanism (not shown) that is controlled by drive circuit 825 that in turn is controlled by CPU 816. Shackle release mechanism 813 also uses a motor, which is controlled by drive circuit 824 that in turn is controlled by CPU 816. It will be understood that the release or locking mechanisms used for the shackle and key compartment can be constructed of many different types of mechanical or electromechanical devices without departing from the principles of the technology disclosed herein.

The crystal oscillator 815 provides a steady or near-constant frequency (e.g., at 32.768 kHz) clock signal to CPU 816's asynchronous timer logic circuit. The ISO-7816 smart card connector 817 connects to smart card contacts to allow the exchange of data between the electronic lockbox's CPU 816 and the memory devices in the smart card.

In one embodiment, the digital temperature sensor 811 is read at regular intervals by the electronic lockbox CPU 816 to determine the ambient temperature. Crystal oscillator 815 may exhibit a small change in oscillating characteristics as its ambient temperature changes. In one type of crystal oscillator device, the oscillation frequency drift follows a known parabolic curve around a 25 degrees C. center. The temperature measurements are used by CPU 16 in calculating the drift of crystal oscillator 815 and thus compensating for the drift and allowing precise timing measurement regardless of electronic lockbox operating environment temperature. As noted above, a single chip can be used to replace the combination of crystal oscillator 815 and temperature sensor 811, such as a part number DS32KHZ manufactured by Dallas Semiconductor.

LED indicator lamps 819 and a piezo buzzer 820 are included to provide both an audible and a visual feedback of operational status of the electronic lockbox 800. Their specific uses are described in detail in other patent documents by the same inventor. Backup capacitor 826 is charged by battery 818 (or perhaps by another power source) during normal operation.

Electronic Key:

Referring now to FIG. 5, a block diagram is provided for showing many of the major electronic components of an electronic key, generally designated by the reference numeral 900. Part of FIG. 5 also diagrammatically shows certain other system components, such as a wide area network 910 and an electronic lockbox 940. This particular lockbox includes a housing 942, a movable door 944 that covers a secure compartment beneath its surface, a shackle 946, and a keypad 948 for entering data via a human user.

The electronic key 900 includes a microprocessor 916, which typically has on-board memory and interface components. On FIG. 5, the on-board memory circuit includes some RAM at 922, and ROM (or EEPROM) at 923. An input/output (I/O) interface circuit is depicted at 930. These on-board hardware components can be similar to those of the electronic lockbox, if desired. However, they are more likely to be part of a smart phone, which typically has very highly capable processing power and relatively large memory capacity.

Other hardware components of electronic key 900 include a power supply 918 (typically a battery), a display 919, a keypad 914 (which typically is part of a touch screen display, particularly if the electronic key is a smart phone and the display viewing area is large), a wide area network (WAN) radio circuit 911, and a low power radio circuit 927. The two radio circuits each have their own built-in antennas, as required for their broadcast and receive frequencies. The WAN radio 911 is designed to communicate with a wide area network, generally designated by the reference numeral 910; if electronic key 900 is a smart phone, for example, then the wide area network would generally be a cellular telephone network.

The low power radio circuit 927 is designed to communicate with one of the lockboxes of the overall security system. More specifically, the lower power radio 927 will exchange data messages with the low power radio circuit 804 of an electronic lockbox 800, as depicted on FIG. 4, or perhaps with the low power radio circuit 27 of an electronic lockbox 10, as depicted on FIG. 1. In the present technology disclosed herein, these low power radio circuits 927, 804, and perhaps 27, could comprise WiFi or BlueTooth technology, particularly if the electronic key 900 is a smart phone. Of course, other communication protocols could be utilized without departing from the principles of the technology disclosed herein. As noted above, a special APP would run on the smart phone (as the electronic key 900), to allow it to communicate with a lockbox 800. The electronic key can be in the form of a smart phone, as noted above, and it also is sometime referred herein to as a "portable communications device."

It should be noted that the electronic lockbox 940 can also be accessed by use of a standard SentriLock smart card, such as the secure memory card depicted at 905 on FIG. 5. However, many of the features of the technology disclosed herein use the "instant" communications capabilities of an electronic key, including those in the form of a smart phone, for communicating both with a lockbox and with the central computer, in real time, or near-real time. Again, such devices can also be referred to as "portable communications devices."

Another form of electronic lockbox is illustrated in FIG. 6. A stationary electronic lockbox is generally depicted at the reference numeral 950. Lockbox 950 has no shackle, and instead is designed to be permanently mounted to a building or other durable fixed structure, for lockbox security systems that can involve dwellings or other types of buildings used for human habitat, or for housing other items in which a protective secure access is desired. In this disclosure, lockboxes 940 and 950 will be said to contain a "dwelling key" in their secure compartments, whether the protected structure or physical area actually contains human occupants or not.

Lockbox 950 has similar structural elements as compared to lockbox 940. There is a housing 952, a movable door 954 that covers a secure compartment beneath its surface, and a keypad 958 for entering data via a human user. Lockbox 950 will include the same electronic components and control software as lockbox 940, sans the shackle latch members and the shackle itself. Lockbox 950 is designed to securely communicate with an electronic key 900 or with a smart card 905, just like lockbox 940.

Figure 7:
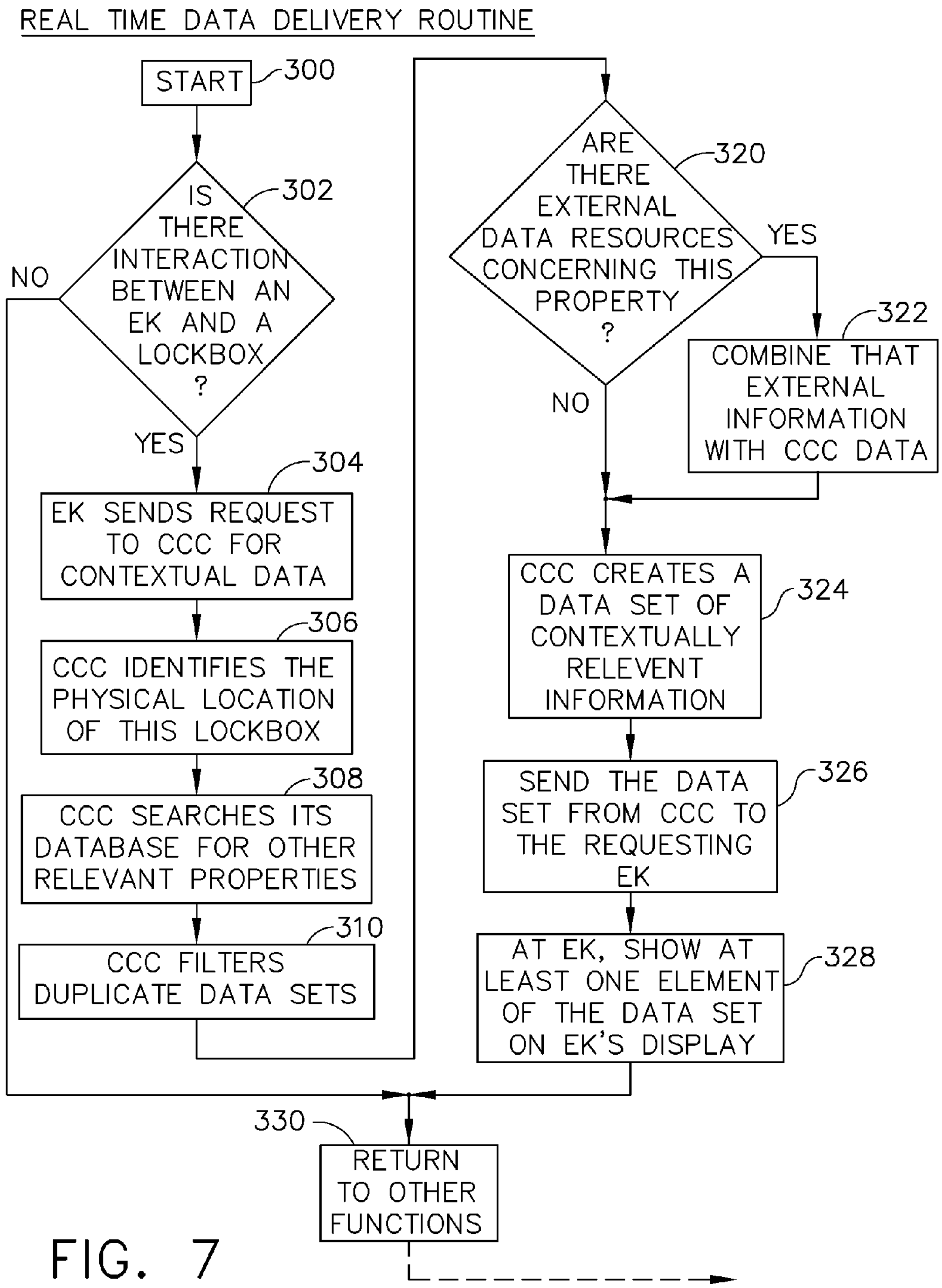
FIG. 7 is a flow chart of some of the steps executed by an electronic lockbox system to perform a "Real Time Data Delivery" routine, as part of the control logic for the technology herein.

Control Logic for Real Time Data Delivery Function:

Referring now to FIG. 7, a flow chart is provided to show some of the important steps performed mostly at the central clearinghouse computer (CCC) for a software routine that performs real time data delivery. Starting at a step 300, a decision step 302 determines whether there has been any interaction between an electronic key and a lockbox that has been reported to the central computer. This would become known at the central computer (the CCC) by some type of message received at the central computer, typically from the electronic key, including a "standard" electronic key such as a smart phone, or a simplified electronic key such as a secure memory card that has been used for years in lockbox systems provided by Sentrilock LLC of Cincinnati, Ohio. If the answer is NO after analyzing one of these messages, then the control logic returns to performing other functions at a step 330. However, if the answer is YES, and if the electronic key has sent a request, then the control logic arrives at a step 304.

At step 304, the electronic key's a request to the central computer is asking for contextual data for the property that is being visited (or that was most recently visited by the sales agent for that electronic key). A step 306 identifies the physical location of this lock box, which is determined at the central computer. A step 308 now has the central computer searching its database for other relevant properties, and then a step 310 has the central computer filtering duplicate data sets. In other words, another sales agent may have previously visited the same lockbox at that property's physical location, and could have asked for the same contextual data. In that situation, a data set of contextual for this same property might already be resident in the database at the central computer, and therefore, the central computer will not need to create a new data set.

Although the central computer can filter duplicate data sets at step 310, there still could be other relevant information that can be requested by the sales agent for the same physical property at the lockbox of interest. Therefore, a decision step 320 now determines whether or not there are external data resources of interest concerning that property. If so, then a step 322 combines that external information with the central clearinghouse computer data that was already being prepared. Examples of other information that could be relevant include information from Multiple Listing Service data (also called "MLS" data), environmental information (e.g., from the EPA), property tax information (e.g., from the County Auditor's website), and school district information.

Whether or not external data resources are available, the logic flow now arrives at a step 324 in which the central computer creates a data set of contextually relevant information. The central computer now sends (or "disseminates") the data set to the requesting electronic key at a step 326. Once that data set is received at the electronic key, a step 328 shows at least one element of the data set on the key's display. The sales agent would typically be able to scroll through various elements of that data set on his or her electronic key.

In essence, the primary function of the flow chart on FIG. 7 is for the central computer to assimilate relevant data for other properties, typically those that are in the same geographic area, and to combine that information with other external data resources concerning the property of interest (or at least properties of interest that are in the same geographic area), and thereby creating the data set that will be downloaded to the electronic key that sent the initial request at step 304. The word "assimilate" in this instance includes gathering data from as many databases as are relevant; it also includes gathering data from only the single database (albeit it a large database) that might reside in the central computer at the time of the search request. Certainly if the first sales agent to reach this property asks for the contextual data, then the assimilation function will not find any duplicate data sets to be filtered at step 310. All of these variations in the control logic for a particular request fall within the meaning of the word "assimilate."

To be most useful, the data delivery for the contextual data request will occur in "real time" or at least in near-real time. Therefore, it will be most likely that the sales agent will be using a "true" electronic key, such as a smart phone, so that the sales agent can make an instantaneous request for the contextual data actually during a property showing, and preferably while in the presence of his or her sales prospect. One of the main points that makes this aspect useful is to disseminate the contextually relevant information while the sales agent is actually meeting with the sales prospect, and while they are both at the property of interest (i.e., where that lockbox is located). While this is not a requirement for performing the functions of FIG. 7, it certainly makes this aspect of the technology disclosed herein more useful.

Figure 8:
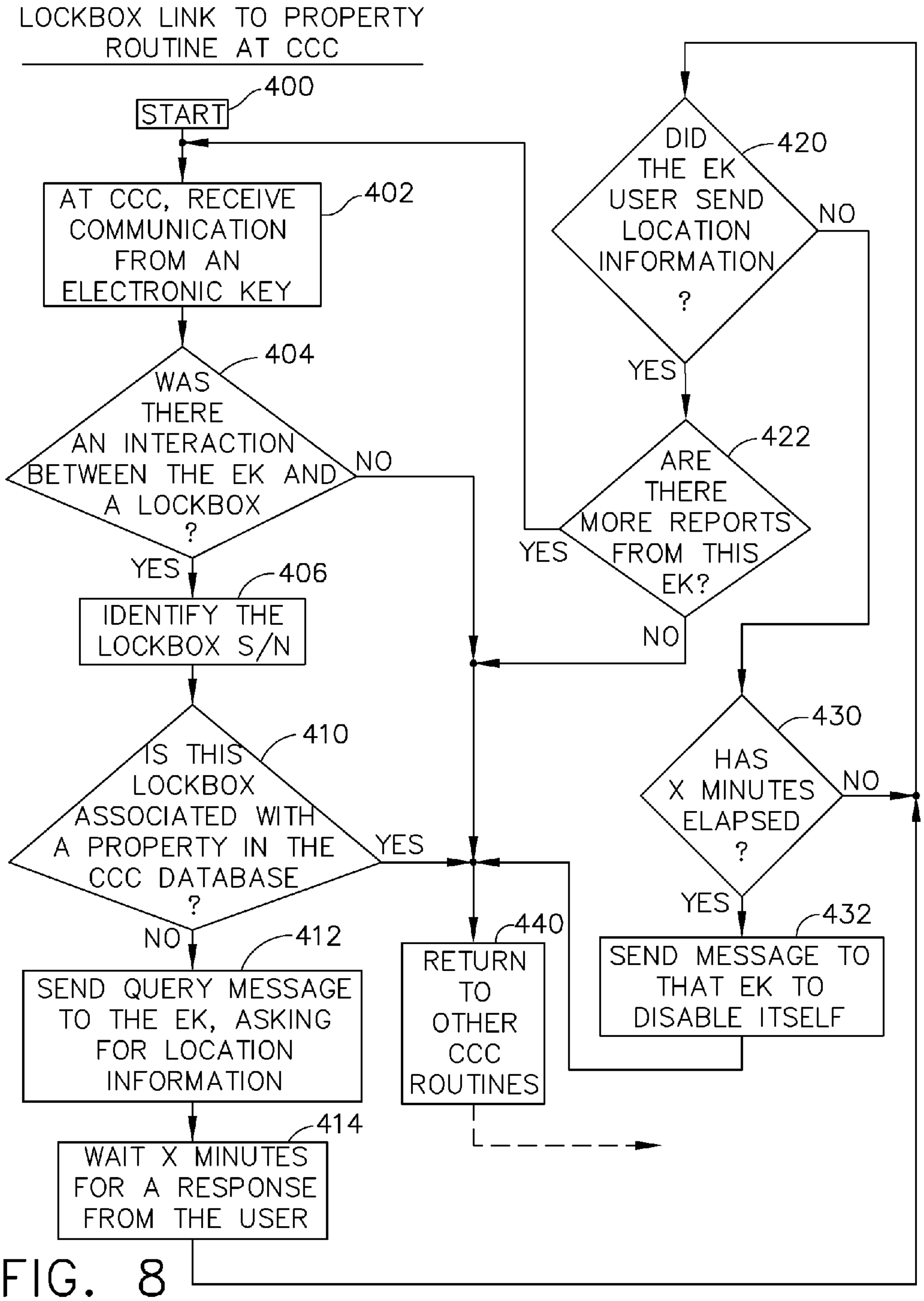
FIG. 8 is a flow chart of some of the steps executed by an electronic lockbox system to perform a "Lockbox Link to Property" routine, as part of the control logic for the technology herein.

Control Logic for Lockbox Link to a "New" Property Function:

Referring now to FIG. 8, some of the important steps of the control logic performed at the central clearinghouse computer for "linking" a lockbox to a particular property are disclosed, starting at a step 400. At a step 402, the central computer receives a communication from an electronic key. A decision step 404 now determines whether or not there was an interaction between the electronic key and a lockbox in the real estate system. If not, then the control logic returns to other central clearinghouse computer routines at a step 440. However, if the answer was YES, then the central computer will identify which lockbox was involved, by receiving the lockbox serial number from the electronic key, at a step 406.

In step 404, the question about whether or not there was an interaction between the electronic key and a lockbox will typically be in the form of an access event report that is received at the central computer from an electronic key. However, it does not necessarily have to be an access event report to be noteworthy, so far as the central computer is concerned. Any kind of interaction between the electronic key and a particular lockbox will be of interest to the central computer, and the central computer will still want to try to identify the lockbox by its serial number and to see if that lockbox is associated with a property that is already in the database at the central computer.

A decision step 410 now determines whether or not this lockbox is associated with a property that already is in the database of the central computer. If the answer is YES, then the control logic returns to performing other central computer routines at step 440. If not, then the central computer will now send a query message to electronic key, asking for location information, at a step 412. In this routine, the clearinghouse computer will now wait for "X" minutes for a response from the user of that electronic key, at a step 414. (It will be understood that with modern computer technology available today, the central computer will not literally wait for X minutes while performing no other routines; instead, the multi-tasking software of the central computer will perform many other routines, while also hoping to receive a response from the user in this particular function of FIG. 8.)

As part of the "waiting" portion of this routine, when a new message is received by the central computer, a step 420 determines whether or not the user of this electronic key has sent the location information that was requested. If not, then a decision step 430 determines whether or not X minutes have elapsed. If not, then this portion of the central computer's control software will go back to "waiting" and the logic flow is directed back to the step 420, where the central computer determines whether or not any message has been received from that user which includes the requested location information.

If the answer was YES at step 420, meaning that the user of the electronic key did send the location information, then a decision step 422 determines whether or not there are more reports from that particular electronic key. An example of that would be an access event report, and there could be more than one such report if the electronic key had been used to visit properties that were out of range of a cellular telephone receiving cell, which means that the electronic key would not have been able to send a report in at an earlier time. If the answer is YES at step 422, then the logic flow is directed back to the starting function at step 402. If there are not more reports from this electronic key, then the logic flow is directed to the return step at 440.

This "lockbox link to property routine" can have some teeth, if the real estate Board desires to implement the next optional feature. At decision step 430, if X minutes has elapsed and the user of the electronic key never sent the requested location information, then the logic flow is directed to a step 432 that will disable the electronic key for that user. This is accomplished by the central computer sending a message to that electronic key telling the key to disable itself. This might seem to be a drastic step, but it would only be executed if the user totally ignores the request from the central computer for a long time period. For example, the value for "X" could be 120 minutes, which would give the user two (2) hours to complete a showing with a sales prospect, and then to send a message to the central computer to identify the location of the property that is associated with that lockbox. If two hours is an insufficient time in the view of the real estate Board, then the value for X can be increased to whatever value seems to be reasonable.

Figure 9:
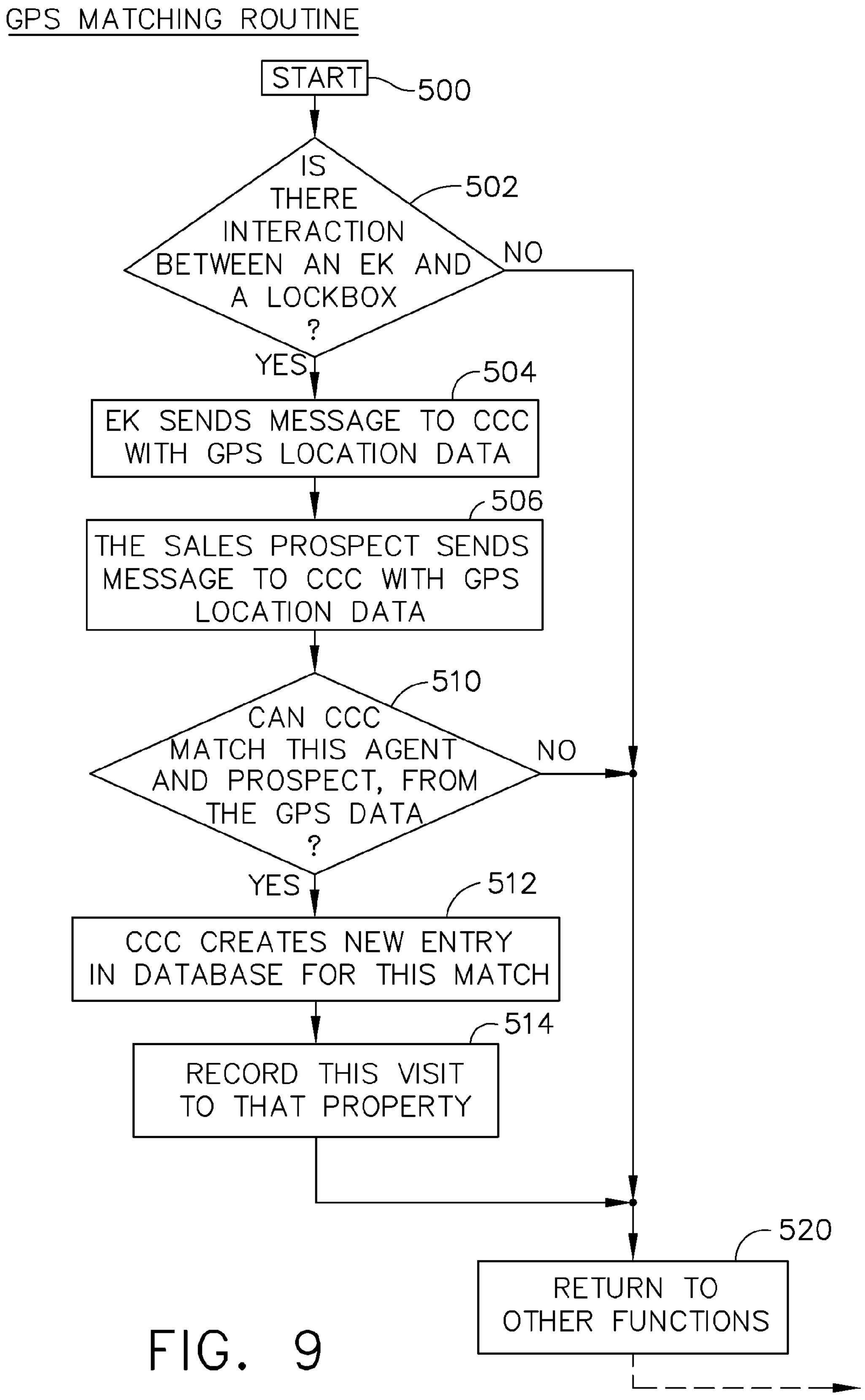
FIG. 9 is a flow chart of some of the steps executed by an electronic lockbox system to perform a "GPS Matching" routine, as part of the control logic for the technology herein.

Control Logic for Sales Agent Matching to Sales Prospect Function, Using GPS Data:

Referring now to FIG. 9, some of the important steps for a routine that matches a sales agent to a sales prospect is provided, starting at a step 500. A decision step 502 determines whether or not there has been an interaction between an electronic key and a lockbox, and if the answer is NO, then the control logic is directed to a step 520 that returns to other functions in the lockbox system. However, if there has been such interaction between an electronic key and a lockbox, one form of that could be if the electronic key sends a message to the central computer that includes GPS location data, at a step 504. Another message could also be received at the central computer from a sales prospect. In that situation, the message at the central computer is received from the sales prospect, and it can include GPS location data, at a step 506.

When the types of messages are received at the central computer that are generated at steps 504 and 506, a decision step 510 will try to match this particular sales agent and prospect, using their GPS data. In other words, if the central computer has received two messages that both have the same, or substantially the same, GPS location data, and if one of those messages is from a sales agent (using an electronic key) and the other message is from a sales prospect (using a cell phone that has a GPS receiver), then these two persons can be "matched." In that situation, the central computer creates a new entry in the database for that match at a step 512. When that occurs, the central computer will also record this visit to the particular property that is in the central computer's database, at a step 514. After that occurs the logic flow is directed to the return step 520.

If the central computer cannot determine any match between this sales agent and a prospect at step 510, then the logic flow is immediately directed to the return step 520.

It will be understood that the decision step 510 may determine a match between the sales agent and the prospect, however, such a match might already exist in the central computer's database. In that situation, then a "new" entry for that match will not be required. However, it is still desirable to have the control logic run through both steps 512 and 514, in case this same sales agent and prospect visit a different property together. In that situation, it will be desirable to record the visit by that matched pair to that second property.

If the central computer determines that the visit to the second property is not the first visit by that matched pair, then that information can be filtered, if desired. However, as will be discussed below in reference to FIG. 10, there are reasons that it is desirable to record all visits to the properties in the real estate Board region, including second visits or even third visits to the same property.

It will be understood that the central computer is already recording visits to particular properties within a real estate Board, and such visits have been recorded by various electronic lockbox systems for years. That information is not necessarily based on any type of GPS location data, but the lockbox access events are recorded at the central computer, and that type of information can be accessed later by the sales agent. The routine of FIG. 9 now allows a sales prospect to also be included in the history of property visits in this central computer system, and it will occur automatically when it is based on GPS location data that is provided in messages from the sales prospect (in step 506), or by GPS location data for a sales agent (in step 504). All of this relevant information, including access events that are not based on GPS data by a sales agent, can be later displayed in a property visit history routine that is discussed immediately below, in reference to FIG. 10.

Figure 10:
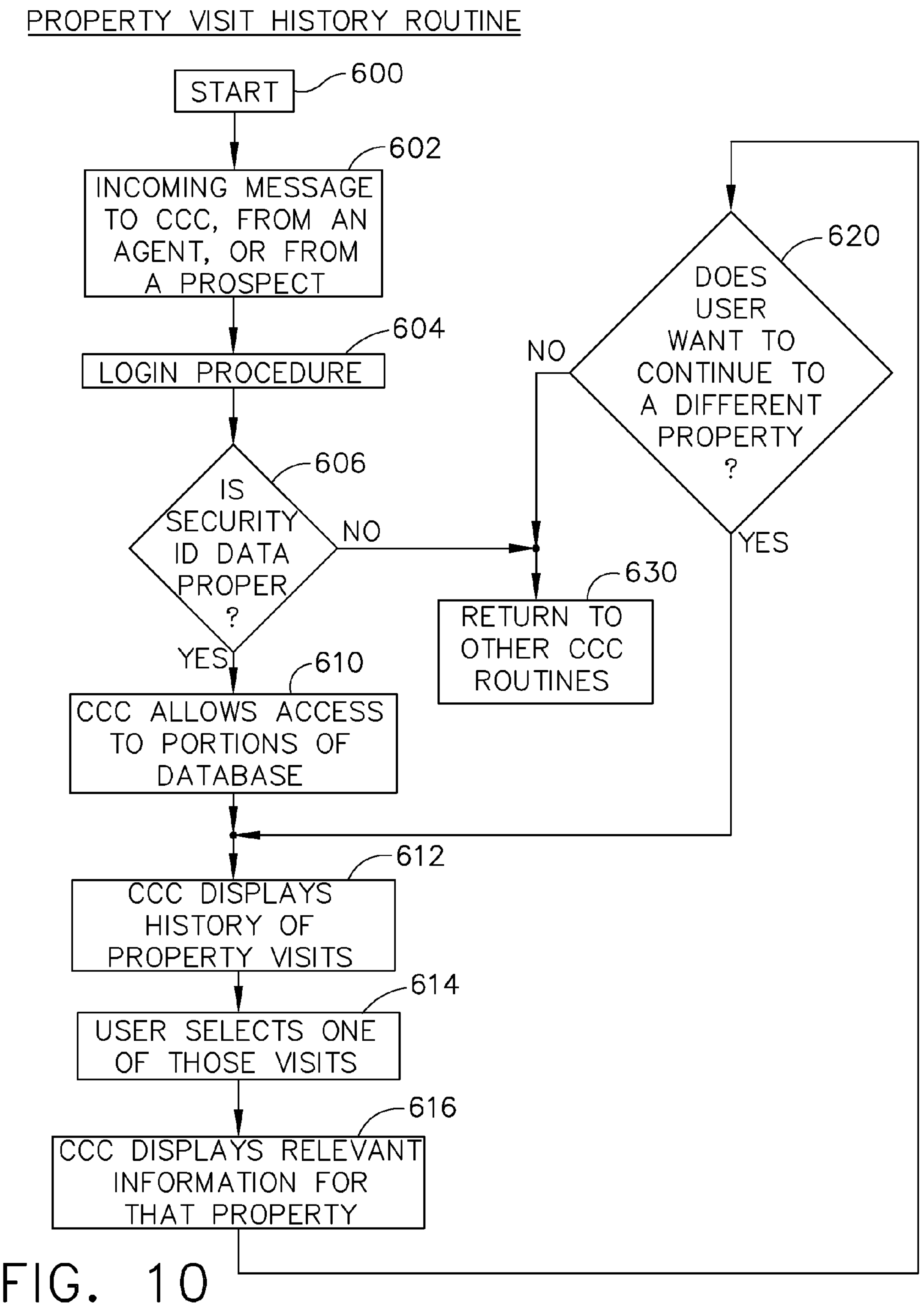
FIG. 10 is a flow chart of some of the steps executed by an electronic lockbox system to perform a "Property Visit History" routine, as part of the control logic for the technology herein.

Control Logic for Sales Agent or Prospect Property Visits History Function:

Referring now to FIG. 10, a flow chart is provided to show some of the important steps in a routine that provides a history of property visits by authorized persons in the central computer system for a real estate Board. It should be noted that, although the routines disclosed herein are described in reference to use with a real estate Board, it will be understood that other types of information systems can use the technology disclosed herein besides standard "real estate boards." Other types of personnel can also use the inventive functions disclosed herein, including authorized persons who might visit certain property locations, such as medical personnel, or fire department or police department personnel, who could access a property by use of a lockbox. Such lockboxes can be permanently attached to a building, such as the lockbox disclosed in FIG. 6 that does not have a shackle.

In FIG. 10, the starting step 600 will be followed by a step 602 in which the central computer of a real estate Board receives a message from an agent or from a sales prospect. When that occurs, the particular agent or prospect must undergo a login procedure, at a step 604. A decision step 606 determines whether or not the security identification data that is provided by the messenger to the central computer is proper. If not, then this routine quickly stops and the logic flow is directed to a return step 630.

It will be understood that there are existing lockbox systems with central computers that have previously established login procedures by authorized sales agents, and that type of procedure can be used in the flow chart of FIG. 10, at steps 602, 604, and 606. However, in FIG. 10 it is also desirable to allow a sales prospect to login to the central computer to perform the remaining steps of FIG. 10. This will require a different type of routine that will allow a non sales agent to be allowed to register a username and password, typically over the Internet, for that central computer. This type of information can be handled by well-known security routines, and may include asking the sales prospect for other identifying information, including "hints" for situations where the user might later forget his or her password, or user name. All of those concepts are possibilities for the control logic on FIG. 10.

Assuming the security identification was proper at step 606, the central computer will allow access to certain portions of its database at a step 610. For this routine of FIG. 10, the "history" of property visits is what is of interest, and that history is displayed by the central computer at a step 612. In this situation, the central computer will be sending information to the sales agent or to the sales prospect, typically over the Internet, and that information will be displayed on either an electronic key or some type of computer that is tied into the Internet. Once the receiving party has that data, then that receiving party (i.e., the user) selects one of those visits that is being displayed, at a step 614. The central computer will now display relevant information for that property, at a step 616. This type of information can be anything that the central computer determines should be allowed for display for that particular user, whether it is a sales agent or a sales prospect. Of course, a sales agent may be allowed to have access to certain types of data that a sales prospect would never be allowed to see, at least not through this routine at this central computer. It will be understood that the interaction between the user and the central computer in steps 610-616 will typically include much back and forth, so that the user can request many different types of information, and then have such information displayed by the central computer, one record at a time.

Once the user is finished looking at the relevant information for that particular property, then the central computer will ask the user whether or not he or she wants to continue to a different property in the history log of property visits, at a decision step 620. If the answer is YES, the logic flow is directed back to step 612, where the central computer again displays a history of property visits for that particular user. The user than can continue by selecting one of those visits at step 614, and so forth. If the user does not want to continue to a different property at step 620, then the logic flow is directed to step 630, where the processing returns to other central clearinghouse computer routines.

Control Logic for Entering Occupant Data at Central Computer

Figure 11:
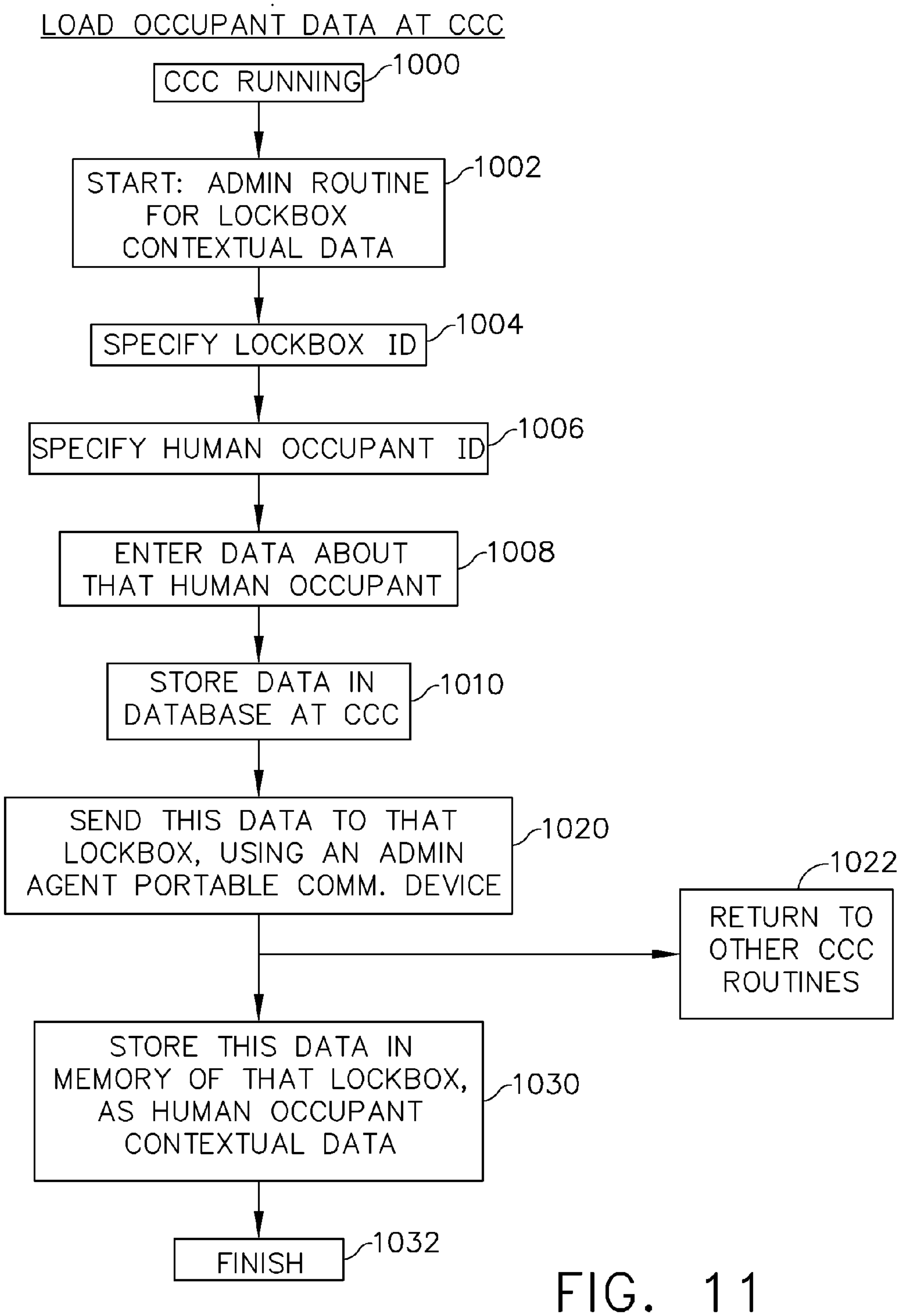
FIG. 11 is a flow chart of some of the steps executed by an electronic lockbox system to perform a routine for loading occupant data at the central computer

Referring now to FIG. 11, a flow chart is provided to show some of the important steps in a routine that is run at the central clearinghouse computer for providing data on human occupants at various specific properties in the electronic lockbox system. The words "central clearinghouse computer" will often be referred to herein merely as the "central computer" or perhaps the "CCC." The central computer is always presumed to be running in these electronic lockbox systems, and the logic flow on FIG. 11 begins at a "running" step 1000.

A step 1002 is the beginning of an administrator routine for providing lockbox contextual data to the central computer. The first piece of information is the lockbox identifier, which must be specified and entered into the database at a step 1004. The overall identification information for the lockbox can contain many pieces of information other than the lockbox identifier, such as the address of the specific property, and if applicable, the "owner" of that specific lockbox. It will be understood that, in most real estate lockbox situations, each lockbox does have a specific human owner, and the human owner is typically a real estate agent, who is one of many such agents in a particular real estate board of a major city. However, in other types of systems that do not necessarily involve the sale of real estate, the individual lockboxes might be owned by a corporation or other organization, such as a retirement home, or a nursing home.

The next step is for the administrator to enter information about the human occupant(s) in connection with a specific lockbox property. This occurs at a step 1006. If, for example, the lockboxes are placed in a retirement home (or a "retirement village"), then there could be more than a single human occupant for a specific lockbox property. In that situation, the data to be entered about the human occupants will be specific, per human occupant. On the other hand, if a couple were living in a single lockbox property, then for example, only one of the two people might have medical issues that need to be entered into the database. In that situation, the data entered at step 1008 will be about that particular human occupant, and the other occupant may or may not have any data entered at all at the central computer. (However, it is common for the second person of a couple to at least have their identification known, typically as a person to contact in the event of a medical emergency for the first person.) All of the above data is to be stored in a database at the central computer, which occurs at a step 1010.

Some or all of the data that will be entered at the central computer also can to be entered at the specific lockbox of interest. A step 1020 refers to that procedure, and assumes that an administrative agent will perform that task. The most likely procedure will be for the agent to carry a portable communication device, such as a smart phone, or "smart device," or perhaps an electronic key (such as one that is typically used in real estate transactions), so that the important data can be carried by the portable communication device and then uploaded onto the individual lockbox when the administrative agent visits that lockbox. The physical procedure will be such that the portable communication device for the administrative agent must be placed in communication with the central computer, using a known medium such as a cellular telephone link or a Wi-Fi link using the Internet, for example, and then having the central computer download that information onto the administrative agent's portable communications device. Once that has occurred, the logic flow for the central computer can be directed to a step 1022, at which time the central computer is directed to its other tasks or routines.

After the data for that particular lockbox has been downloaded onto the administrative agent's portable communications device, that agent can now store that data into the memory of the specific lockbox of interest. Typically that would involve a personal visit by the administrative agent to the lockbox, which could either occur on site at the property of interest, or it could occur in the agent's office, in which the agent would be holding the lockbox at his or her office before installation at the actual property. In either event, the agent would use a communications link, such as Bluetooth or other type of short range wireless communications link, and then the specific data will be uploaded into the memory of that lockbox. This data will become the contextual data for at least one human occupant that dwells at the property where the lockbox will be installed, or has already been installed. This occurs at a step 1030. Once that has been accomplished, the logic flow on FIG. 11 has been completed at a finished step 1032.

Control Logic for Exchange of Contextual Data at a Lockbox

Figure 12:
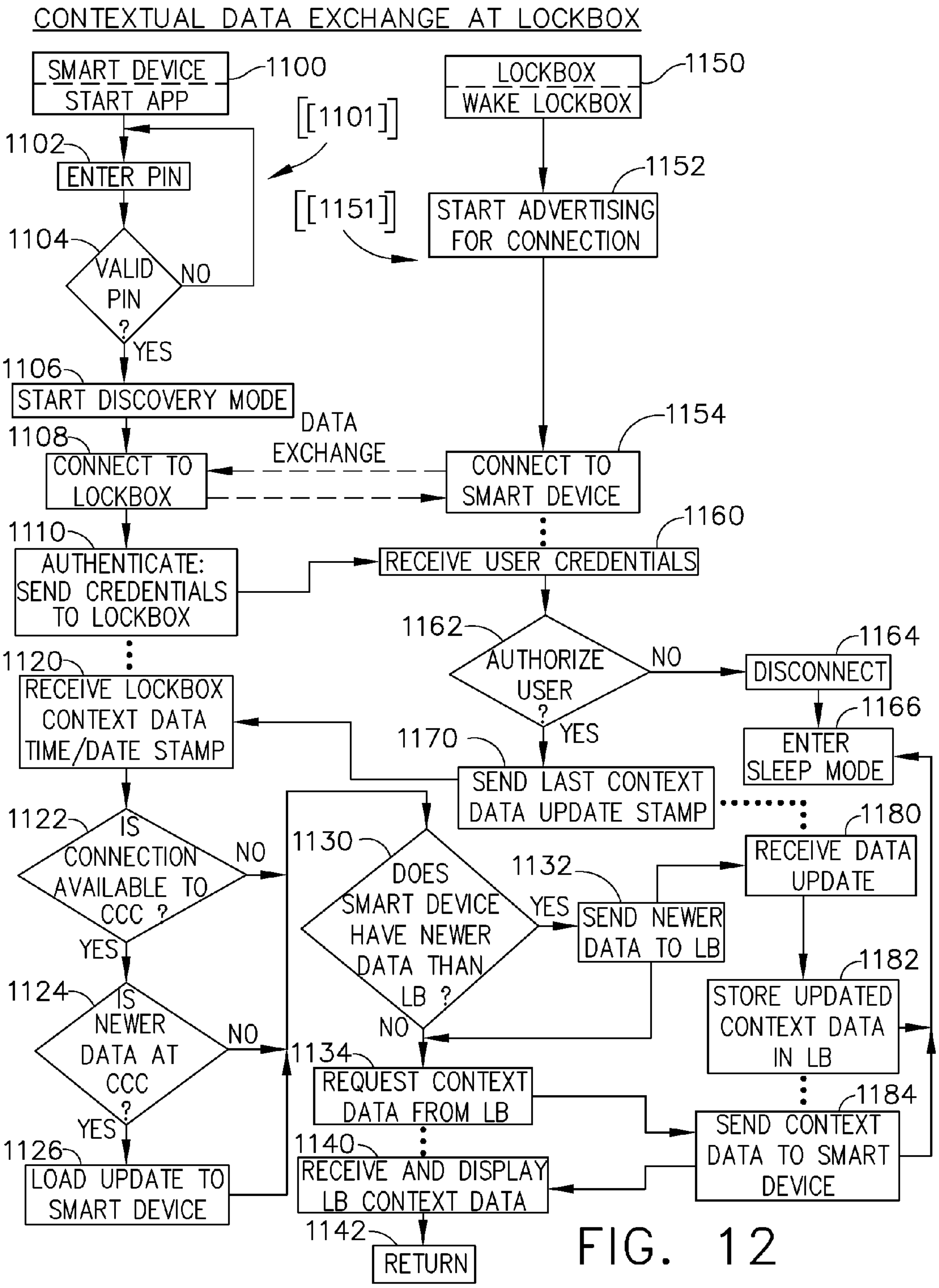
FIG. 12 is a flow chart of some of the steps executed by an electronic lockbox system to perform a "Contextual data exchange at a lockbox" routing.

Referring now to FIG. 12, a flow chart is provided to show some of the important steps in a routine that allows contextual data to be exchanged between a lockbox and an authorized agent. As described above in reference to FIGS. 1-10, a typical "agent" visiting a lockbox would be a "sales agent," and more specifically a real estate agent in many situations. However, with regard to some of the later figures, the person visiting the lockbox could be an "administrative agent" who is also often referred to as an "administrator." In the case of either type of agent, the agent will be carrying a smart device such as a smart phone or an electronic key. That agent will start an "APP" on his or her smart device at a step 1100 on FIG. 12.

Once the APP has started, the agent will enter his or her personal identification number (or "PIN") at a step 1102. The smart device itself will determine whether or not the PIN that was entered is valid at a step 1104. If not, then the logic flow is directed back to step 1102 which allows the agent to try again entering a valid PIN. If a valid PIN was determined at step 1104, then a "discovery mode" is started at a step 1106. The first major event after starting the discovery mode is for the smart device to "connect" to the lockbox, at a step 1108. Before this description continues, some of the operational functions of the lockbox itself will now be described.

There are various types of lockboxes that are used for real estate sales and for perhaps other types of properties or economic activities. Most if not all of these lockboxes operate in a low power mode, and in some cases that mode is referred to as a "sleep" mode. This is true for lockboxes sold by SentriLock LLC, of Cincinnati, Ohio. This description about FIG. 12 will assume that it is a SentriLock-style lockbox being used in this flow chart. At the lockbox itself, it must be awakened from its sleep mode, and the user can perform a particular procedure at a step 1150 to wake the lockbox. In a typical SentriLock-style lockbox, the agent visiting the lockbox site must touch one of the buttons on the keypad. For example, this would be a keypad such as that depicted on FIG. 6, in which the keypad is generally designated by the reference numeral 958, and the lockbox is designated by the reference numeral 950. FIG. 5 also shows an earlier version of a SentriLock-style lockbox that includes a shackle 946.

Once the lockbox has been awakened, it quickly starts "advertising" for connection using a Bluetooth protocol, at a step 1152. The word "advertising" is a Bluetooth term, and has the meaning in this system of the lockbox sending a certain data packet using its short range wireless communications circuit, and part of that data packet includes the identifier information for that lockbox. In SentriLock systems, each lockbox has a specific numeric identifier, and that information is part of the broadcast in the "advertising for connection" step 1152.

The Bluetooth protocol is such that, once one of its devices begins advertising, it is expecting to connect to another Bluetooth device. On FIG. 12, a step 1154 attempts to connect to a smart device using a data exchange. As can be seen on FIG. 12, with regard to the logic flow, the data exchange is between steps 1108 and a step 1154, in which the smart device attempts to connect to the lockbox, while at the same time the lockbox attempts to connect to the smart device. This data exchange is automatic, using proper computer programming, which the APP will contain, as well as the lockbox. The agent's smart device must be authenticated to the lockbox, and a step 1110 now sends its credentials to the lockbox (via the short range wireless communications link)

The lockbox then receives the user credentials at a step 1160, and at a decision step 1162, the lockbox determines whether or not the credentials are for an authorized user. If not, then the lockbox disconnects the short range wireless communications link at a step 1164, and goes back into its sleep mode at a step 1166. Of course, the agent can quickly attempt to again wake up and connect to the lockbox, especially if the agent made a mistake when entering the PIN.

If the authorized user credentials were authenticated at decision step 1162, then the lockbox will now send the last contextual data update time/date stamp back to the smart device, at a step 1170. This will be a brief communication packet, and in this example, this message would not actually contain the contextual data itself, but only the effective time/date stamp of the most recent update of the contextual data that was loaded into the lockbox memory.

The APP program on the smart device is expecting to receive the effective time/date stamp from the lockbox, which will occur at a step 1120. As noted above, this is merely a small data packet containing the effective time/date stamp of when the lockbox had its last uploading of undated contextual data. It is not the actual contextual data content itself. The agent will now attempt to connect to the central computer, using the wide area network communication circuit that is part of the smart device. With regard to the functions of the operating software in the APP itself, this leads to a decision step 1122 that determines whether or not a connection is available to the central computer. If the answer is YES, then a decision step 1124 determines whether or not there is newer data at the central computer for this particular lockbox. If the answer again is YES, then the newer contextual data for that lockbox is now downloaded to the smart device at a step 1126. This is a data download from the central clearing house computer to the smart device, and the included contextual data will later be uploaded to the lockbox.

The results for the questions at decision steps 1122 or 1124 could, of course, be negative. If that is true for either one of those decision steps, then the logic flow is directed to a decision step 1130. For that matter, the logic flow from step 1126 is also directed to this decision step 1130. At this point in the logic of this flow chart, the smart device contains the newest possible data available both to it and to the central computer (assuming the central computer connection was just available), and now the decision step 1130 will determine whether or not the smart device has newer contextual data than the lockbox itself. If the answer is YES, then this newer contextual data will be sent to the lockbox in a data upload at a step 1132. On the other hand, if the answer is NO at decision step 1130, then the smart device will request a data download from the lockbox at a step 1134. In other words, if step 1134 is reached, then it turns out that the lockbox had more recent contextual data than the smart device that was just presented by this particular agent. This typically would not happen if this agent had been able to connect to the central computer at step 1122, but even then it might be possible in certain circumstances for the lockbox to have more recent contextual data than the smart device.

In any event, if step 1134 is reached in this logic flow, then the contextual data will be requested from the lockbox and the logic flow will continue to a step 1184. The step 1184 will now send the contextual data that was stored in the lockbox to the smart device, being received at the smart device at a step 1140. In addition to receiving that contextual data, the smart device can display the lockbox contextual data on its user display screen, and the user can perform other APP functions after returning from this routine at a step 1142.

Returning back to logic step 1132, the newer contextual data is being sent to the lockbox at this step, and that newer contextual data is received at the lockbox as a data update at a step 1180. The updated contextual data is now stored in the lockbox at a step 1182. Once the lockbox has finished storing updated contextual data or sending contextual data to the smart device at one of the steps 1182 or 1184, then the lockbox can reenter its sleep mode at step 1166. Other lockbox functions can be performed by the agent, by again wakening the lockbox and performing those other functions, as desired.

The detailed steps that are illustrated on the flow chart of FIG. 12 are essentially divided into two halves, a smart device half and a lockbox half. The smart device half is generally referred to as an overall routine and designated by the reference numeral 1101. The lockbox half of these steps comprises its own routine and is generally designated by the reference numeral 1151. These sub-routines 1101 and 1151 are used in many of the other flow charts described herein, which generally refer to the specific steps, as needed.

Installation of Lockbox at a Specific Property

Figure 13:
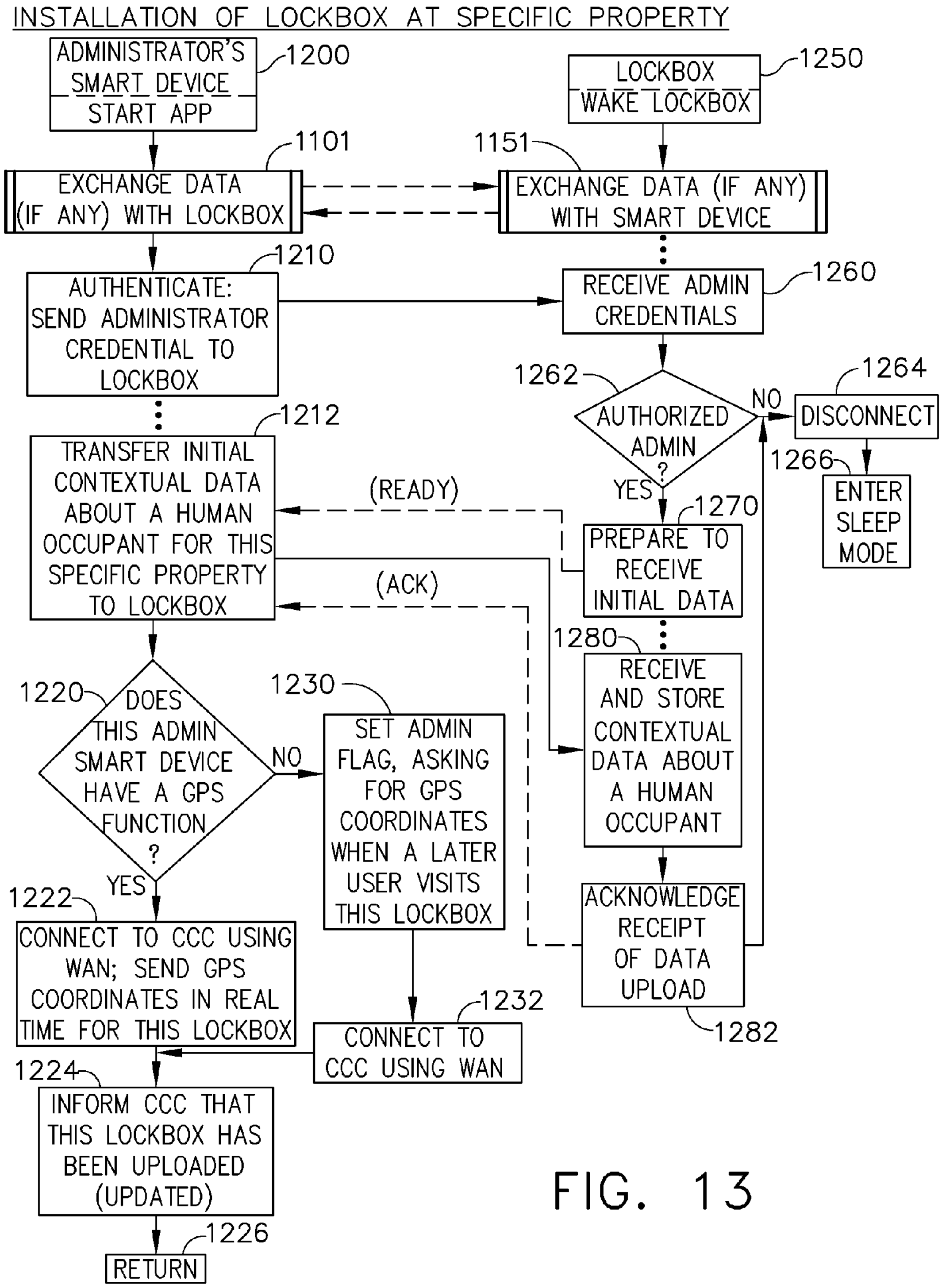
FIG. 13 is a flow chart of some of the steps executed by an electronic lockbox system to perform a routine for installing a lockbox at a specific property

Referring now to FIG. 13, a flow chart is provided to show some of the important steps of an installation routine in which a lockbox is installed at a specific property, and this property has to do with human occupants and contextual data will be available for those human occupants. As in the flow chart of FIG. 12, this flow chart of FIG. 13 has two major columns, one for the smart device and one for the lockbox. In this particular circumstance, the smart device is not typically one used by a sales agent, but instead is used by an administrator or an administrative agent.

Once the administrative agent arrives at the lockbox site, the APP is started on the smart device for that administrator at a step 1200. The administrator also needs to wake up the lockbox at a step 1250. If data needs to be exchanged at this time, that exchange will occur in steps 1101 and 1151, which are the “major” sub-routines described on FIG. 12. Not every one of the steps depicted on FIG. 12 needs to be implemented at this point, but many of those functions are required before reaching the further steps on this flow chart of FIG. 13.

Now that a short range wireless link (such as Bluetooth) has been established between the smart device and the lockbox, the administrator must authenticate the smart device to the lockbox, and the credentials for the smart device and the administrator are sent to the lockbox at a step 1210. The lockbox receives the administrator’s credentials at a step 1260, and a decision step 1262 determines whether or not these are an authorized administrative agent and administrator device. If not, a step 1264 disconnects the short range wireless communications link, and the lockbox enters a sleep mode at a step 1266.

On the other hand, if the administrator’s smart device passes the authentication test, then the lockbox prepares itself to receive initial data at a step 1270. In that event, the lockbox sends a brief packet to inform the smart device that the lockbox is ready to receive the data, and the smart device will now transfer the initial contextual data about a human occupant for this specific property to the lockbox at a step 1212. That data upload is received at the lockbox and then stored in the lockbox memory at a step 1280. The lockbox will then acknowledge receipt of this data upload at a step 1282, and then disconnect at a step 1264. This acknowledgement can be sent in the form of a small data packet or “ACK” message sent back to the smart device.

After the initial upload of contextual data from the smart device to the lockbox, the smart device APP program now determines whether or not this administrator’s smart device has a GPS function. If YES, then the smart device attempts to connect to the central computer using its wide area network communications circuit at a step 1222. Assuming the connection is made, then the GPS coordinates of the smart device are sent in near-real time to the central computer, and the central computer will receive those GPS coordinates and store those coordinates as being the correct location for this lockbox. Of course, the GPS coordinates are not precisely the same as the lockbox, although the administrator is supposed to perform this function in close proximity to the lockbox; assuming that is true, those coordinates will be used by the central computer in the future. A certain amount of tolerance in the GPS coordinates will be presumed (predetermined) by the central computer in future operations involving this specific lockbox at this specific property site.

On the other hand, if the administrator's smart device does not have a GPS function, then a flag is set asking for the GPS coordinates to be uploaded to the central computer when a later user visits this lockbox, which is part of a step 1230. When that later user visits the lockbox and runs the APP, the administrative flag will appear on that person's smart device, and the smart device will attempt to connect to the central computer using its WAN circuit at a step 1232. From either logic step 1232 or step 1222, the logic flow will then be directed to a step 1224, in which the smart device of the administrator informs the central computer that this particular lockbox has been either uploaded or updated with contextual data. This routine now returns to other APP routines at a step 1226.

It will be understood that the actual data upload of contextual data for a specific lockbox does not necessarily need to occur on site, but instead could occur in the administrator's office, if desired. However, the GPS functions described above, starting at decision step 1220, do need to occur on site, because the GPS coordinates are supposed to represent the actual lockbox location after it was installed at the human occupant's dwelling, or other type of site. If that is not done properly, then of course those GPS coordinates will be meaningless. It should be understood that this method of providing GPS coordinates for a lockbox are not necessarily limited to electronic lockbox systems that involve contextual data about human occupants. Of course, real estate lockboxes can also have GPS coordinate information as well, and the flow chart of FIG. 13 is one way to provide that information to the central computer.

CCC Sends Contextual Data to Sales Prospect

Figure 14:
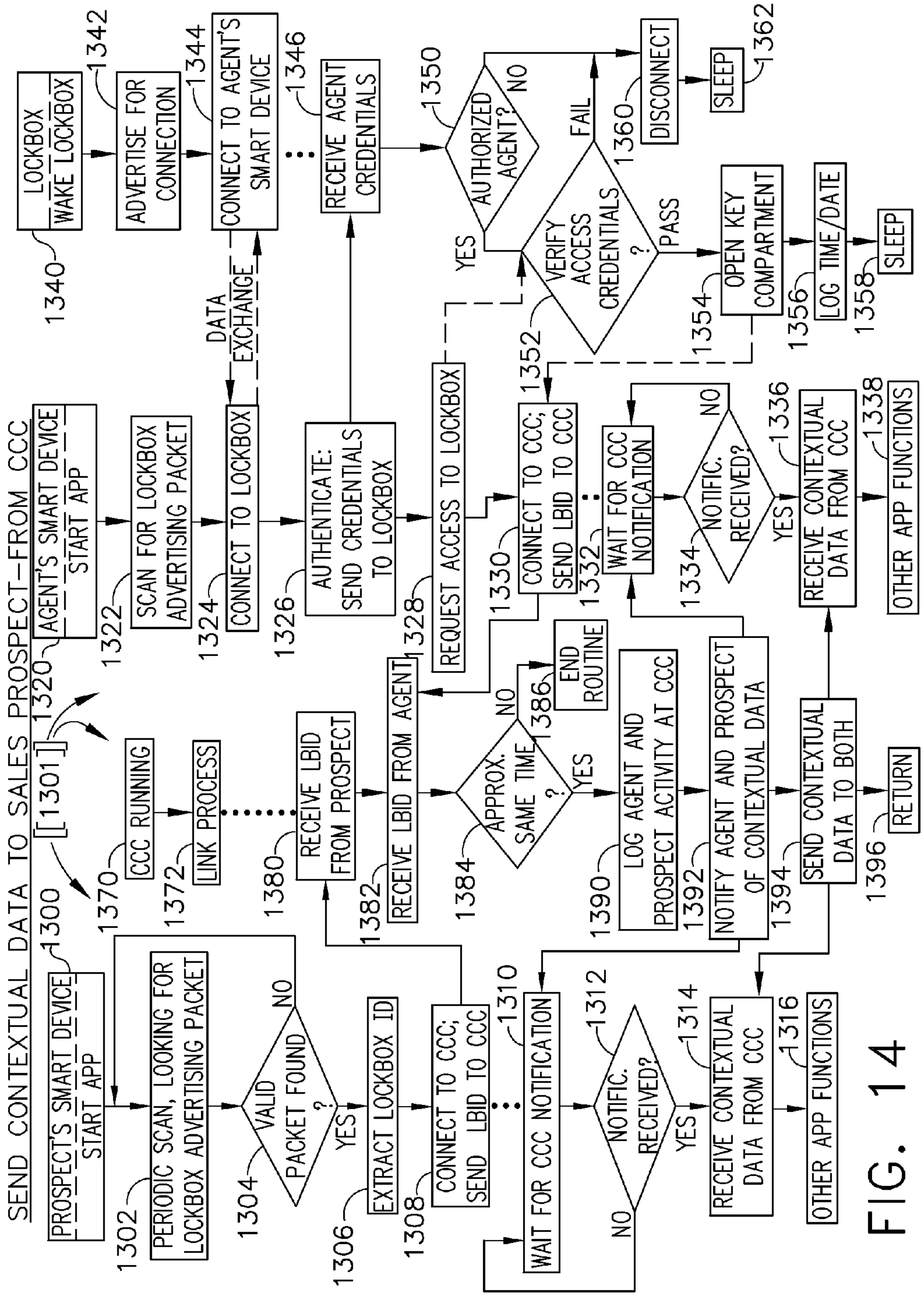
FIG. 14 is a flow chart of some of the steps executed by an electronic lockbox system to perform a routine for sending contextual data from the central computer to a sales prospect using lockbox identifier information.

Referring now to FIG. 14, a flow chart is provided to show some of the important steps in a routine that allows a central computer to send contextual data to a sales prospect based upon a lockbox's identifier code. This flow chart illustrates essentially four separate routines that are all performed more or less simultaneously, although there is a certain logical order that generally must be observed. The left-hand column is the logic flow for the prospect's smart device, the next column to the right on this figure is the logic flow running at the central computer, while the next column to the right is the logic flow for the sales agent's smart device, and the right-hand column is the logic flow for the lockbox operations.

This overall logic flow chart is also generally designated by the reference numeral 1301, and it will be used as a sub-routine in a later drawing. Beginning at a step 1300, the sales prospect starts the APP on his or her smart device. The APP will now perform a periodic scan, looking for an advertising packet from the lockbox, at a step 1302. (In this flow chart of FIG. 14, some of the terminology refers to Bluetooth protocols, while keeping in mind that various types of electronic lockbox systems can use other protocols for their short range wireless communications links.) As an initial condition, both the sales prospect and the sales agent must arrive at the lockbox site, so that both persons are in relatively close proximity to each other and to the lockbox.

A decision step 1304 determines whether or not a valid packet has been found at the prospect's smart device. If not, then the smart device continues looking for the lockbox advertising packet. On the other hand, if the packet has been found, then the lockbox's identifier code is extracted at a step 1306. The prospect's smart device now attempts to connect to the central computer at a step 1308. Once that connection has been established, the prospect's smart device sends the lockbox identifier code to the central computer. That code is received at a step 1380, which will be discussed below.

The central computer is assumed to be running at a step 1370 and, for it to communicate with other devices, it must undergo a link process at a step 1372. In essence, the central computer is always attempting to link with external devices, and has the capability for linking with multiple such devices in multi-tasking, seemingly parallel logic routines, and it can maintain multiple communications sessions with those multiple devices in near-real time. The central computer is powerful enough to interact with these multiple user devices quickly enough so that it often does appear to be in actual real time.

The lockbox identifier that was sent by the sales prospect at step 1308 is received by the central computer at a step 1380. The central computer knows that another piece of information is needed before continuing with this logic flow, so it now continues the link process awaiting a message from a sales agent.

The sales agent has a smart device and he or she starts the APP on that smart device at a step 1320. Upon arriving at a lockbox site, the agent's smart device begins scanning for the lockbox advertising packet at a step 1322. Once it receives the advertising packet from the lockbox, the agent's smart device connects to the lockbox at a step 1324. An actual (wireless) connection must take place before continuing further with this logic routine.

A typical SentriLock-style lockbox is in its sleep mode until awakened, which occurs at a step 1340 on FIG. 14. Once that occurs, the lockbox automatically advertises for a connection with an external device, at a step 1342. The agent has a smart device attempting to connect to the lockbox at step 1324, and the lockbox has a software-driven operating routine that attempts to connect to the agent's smart device at a step 1344. The necessary data exchange will take place between these two steps 1324 and 1344, as illustrated on FIG. 14. These are all short range wireless communications using a protocol such as Bluetooth.

The agent must authenticate the smart device to the lockbox, and that occurs by sending the agent's credentials along with the smart device's credentials to the lockbox, at a step 1326. These credentials are received by the lockbox at a step 1346. The lockbox now determines whether or not this is both an authorized agent and an authorized agent's smart device at a decision step 1350. If not, then the lockbox disconnects the short range wireless communications link at a step 1360, and goes back into its sleep mode at a step 1362. On the other hand, if the authentication step shows that the agent and smart device are authorized, then the logic flow is directed to a decision step 1352.

The lockbox also must verify the access credentials before opening its secure compartment. This occurs at a decision step 1352. Some electronic lockboxes perform the authorization of the agent and the verification of the access credentials in a single step, while others do it in two separate steps (as illustrated on FIG. 14). In either situation, the agent must be authorized to both "talk" to the lockbox and to access the secure compartment before the lockbox will allow its secure compartment to be opened. On the other hand, in some electronic lockbox systems, an agent may be authorized to perform certain functions with a lockbox but would not necessarily be authorized to actually open its secure compartment. The two step process illustrated on FIG. 14 allows for that possibility.

If the access credentials analysis procedure fails at step 1352, then the lockbox again disconnects its short range wireless communication circuit at step 1360 and goes back to sleep at step 1362. On the other hand if the access credentials pass muster, the lockbox will open its key compartment at a step 1354.

Looking back at the logic flow for the agent's smart device, in some electronic lockbox systems, after the agent sends credentials to the lockbox a separate request (or command) to access the lockbox also needs to be sent. If that is the case in a particular system, then a step 1328 will send that request/command message to the lockbox. That is part of the verification of the access credentials decision step 1352 that must be evaluated by the lockbox. Assuming everything is normal and the authorization procedures pass muster, the lockbox in many systems will send a message back to the agent's smart device to inform that smart device that the key compartment access has been approved and that the key compartment will be opened. That communication can occur by sending a quick data packet from the lockbox to the agent's smart device. The agent's smart device will recognize this circumstance at a step 1330, and it will then attempt to connect to the central computer and then send the lockbox identification code to the central computer. It will be understood that all of the functions listed in the flow chart steps 1326, 1328, and 1330 can occur in a single logical procedure, if desired, depending upon the system designer's choice for that lockbox operating system and for the software written for the agent's APP.

The central computer has been waiting to receive the lockbox identifier from the agent, and when that message has been received the central computer will recognize that event at a step 1382. A decision step 1384 now is performed in which the central computer determines whether or not it received the lockbox identifier from both the prospect and from the agent at approximately the same time. If the answer is NO, then this routine is ended at the central computer at a step 1386. On the other hand, if the result is YES, then the central computer logs this event (or activity), in which the agent and the prospect have both visited the lockbox and the agent has actually opened the lockbox secure compartment, at a step 1390.

After the central computer has received and analyzed the lockbox identifier messages from both the prospect and the agent, and after it has logged this activity, the central computer will now notify the agent and the prospect that contextual data is available for this lockbox, at a step 1392. (This function or step depends, of course, on there actually being contextual data available for that specific lockbox.) After sending the lockbox identifier to the central computer, both smart devices for the agent and the prospect are now waiting for "notification" from the central computer. Otherwise the smart devices would have to be more or less pinging periodically to see if information has been received from the central computer. The notification message sent by the central computer at step 1392 can be received at the prospect's smart device at a step 1310 and at the agent's smart device at a step 1332. Both smart devices have a decision step 1312 or 1334 to analyze whether or not a notification has been received, and if the answer is YES, then both are ready to receive contextual data from the central computer, at a step 1314 or 1336, respectively. The central computer sends the contextual data to both devices at a step 1394. The central computer has now completed this routine and returns to other functions at a step 1396.

At this stage in the logic, both smart devices can now perform other APP functions at a step 1316 or a step 1332, respectively, for the prospect's smart device and the agent's smart device. These other APP functions include displaying the contextual data in various formats, as controlled by user inputs and by the APP functions.

With regard to the lockbox, once it has opened its key compartment at step 1354, it logs the time and date of this event at a step 1356 and then goes back into its sleep mode at a step 1358. For the functions of FIG. 14, the lockbox really did not perform any specific functions with regard to contextual data.

Control Logic for a Sales Agent to Send Contextual Data to a Sales Prospect

Figure 15:
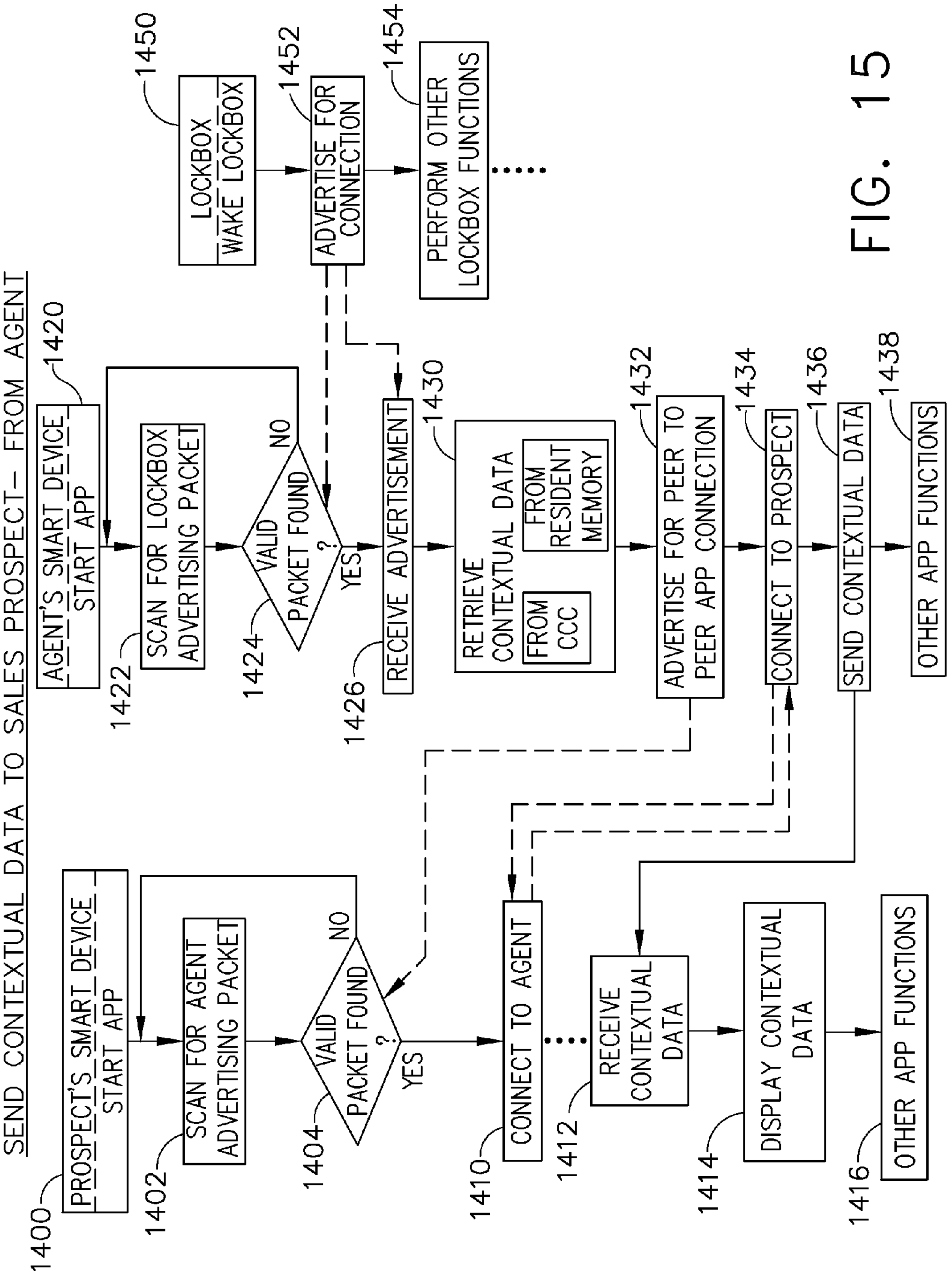
FIG. 15 is a flow chart of some of the steps executed by an electronic lockbox system to perform a routine for sending contextual data from a sales agent to a sales prospect.

Referring now to FIG. 15, a flow chart is provided to show some of the important steps in a routine that allows a sales agent to send contextual data to a sales prospect. As an initial condition, both the sales prospect and the sales agent must arrive at the lockbox site, so that both persons are in close proximity to themselves and to the lockbox.

On FIG. 15, there are three separate columns of logical functions, one for the smart device of the prospect, one for the smart device of the agent, and one for the lockbox itself. Beginning at a step 1400, the prospect starts the APP on his or her smart device. The APP now scans for an advertising packet to be received from the agent, at a step 1402. A decision step 1404 continues essentially in a do-loop until that advertising packet has been received.

In seemingly a parallel operation, the sales agent starts the APP on his or her smart device at a step 1420. The agent's smart device now scans for an advertising packet from the lockbox at a step 1422. A decision step 1424 keeps the function essentially in a do-loop until that packet has been received, in which the advertisement is noticed at a step 1426.

The lockbox is typically in its sleep mode and it needs to be awakened at a step 1450. The first thing the lockbox does is to begin advertising for a connection at a step 1452. It can also perform other lockbox functions at a step 1454 on this flow chart of FIG. 15. As can be seen from this simplistic set of logical steps, the lockbox secure compartment is not being accessed in this routine.

The smart device of the agent performs most of the important logical steps in this flow chart of FIG. 15. Once the advertisement has been received from the lockbox, the agent's smart device now extracts the lockbox unique identifier. Based on that information, the agent's smart device can attempt to retrieve contextual data for that particular lockbox at a step 1430. The contextual data can be stored in two different possible locations: First the central computer could have it, and second the memory resident on the agent's smart device could contain that contextual data. (Note: the lockbox could also store this contextual data; however, that does not come into play on FIG. 15, because the lockbox is not being accessed with regard to opening its secure compartment.)

Regardless of where the contextual data is being retrieved from, the agent's smart device will now advertise for a peer to peer APP connection, at a step 1432. This is the advertisement that the prospect's smart device has been waiting for at steps 1402 and 1404. Once a valid packet has been received at step 1404, then the prospect's smart device will now attempt to connect to the agent at a step 1410. At the same time the agent's smart device will attempt to connect to the prospect at a step 1434. A necessary data exchange takes place to make those connections.

Now that the two smart devices are connected by a short range wireless communications link, the agent's smart device will send contextual data for this particular lockbox to the prospect's smart device at a step 1436. The prospect's smart device receives that contextual data at a step 1412. This contextual data will be displayed on the prospect's smart device at a step 1414, and that smart device can continue to other APP functions at a step 1416. Similarly, the agent's smart device can continue to other APP functions at a step 1438. It will be understood that the APPs running on the two smart devices described on FIG. 15 have many functions relating to contextual data, or other types of information with regard to these electronic lockbox systems, and the various functions of data can be called up and utilized as desired by their respective users.

Figure 16:
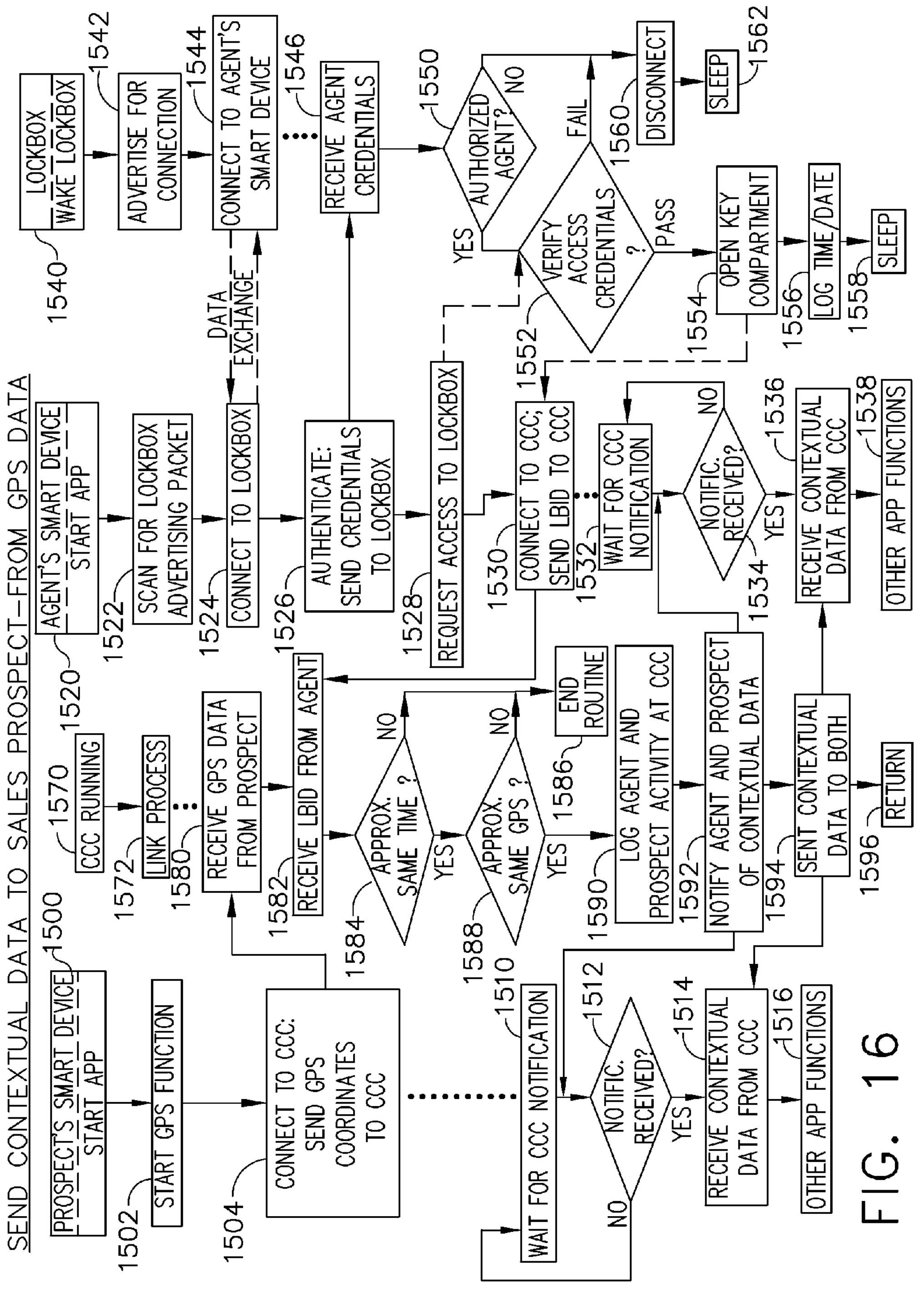
FIG. 16 is a flow chart of some of the steps executed by an electronic lockbox system to perform a routine for sending contextual data from the central computer to a sales prospect, using GPS data of the sales prospect's smart device.

Control Logic for Contextual Data to be Sent to Sales Prospect Based on GPS Data Referring now to FIG. 16, a flow chart is provided to show some of the important steps in a routine that provides contextual data to a sales prospect, but in this instance the information provided to the central computer is based on GPS data from the prospect. This flow chart illustrates essentially four separate routines that are all performed more or less simultaneously, although there is a certain logical order that generally must be observed. The left-hand column is the logic flow for the prospect's smart device, the next column to the right on this figure is the logic flow running at the central computer, while the next column to the right is the logic flow for the sales agent's smart device, and the right-hand column is the logic flow for the lockbox operations.

Beginning at a step 1500, the sales prospect starts the APP on his or her smart device. As an initial condition, both the sales prospect and the sales agent must arrive at the lockbox site, so that both persons are in relatively close proximity to each other and to the lockbox. After the APP has started functioning on the prospect's smart device, the same smart device will start its GPS function at a step 1502. This of course means that the smart device of the prospect must establish a satellite link to the GPS constellation of satellites and extract its actual GPS location in terms of its coordinates, so that information can be uploaded to the central computer. The prospect's smart device now attempts to connect to the central computer at a step 1504. Assuming that connection actually occurs, then the GPS coordinates are sent to the central computer.

The central computer is assumed to be running at a step 1570 and, for it to communicate with other devices, it must undergo a link process at a step 1572. In essence, the central computer is always attempting to link with external devices, and has the capability for linking with multiple such devices in multi-tasking, seemingly parallel logic routines, and it can maintain multiple communications sessions with those multiple devices in near-real time.

The sales agent has a smart device and he or she starts the APP on that smart device at a step 1520. Upon arriving at a lockbox site, the agent's smart device begins scanning for the lockbox advertising packet at a step 1522. Once it receives the advertising packet from the lockbox, the agent's smart device connects to the lockbox at a step 1524. An actual (wireless) connection must take place before continuing further with this logic routine.

A typical SentriLock-style lockbox is in its sleep mode until awakened, which occurs at a step 1540 on FIG. 16. Once that occurs, the lockbox automatically advertises for a connection with an external device, at a step 1542. The agent has a smart device attempting to connect to the lockbox at step 1524, and the lockbox has a software-driven operating routine that attempts to connect to the agent's smart device at a step 1544. The necessary data exchange will take place between these two steps 1524 and 1544, as illustrated on FIG. 16. These are all short range wireless communications using a protocol such as Bluetooth.

The agent must authenticate the smart device to the lockbox, and that occurs by sending the agent's credentials along with the smart device's credentials to the lockbox, at a step 1526. These credentials are received by the lockbox at a step 1546. The lockbox now determines whether or not this is both an authorized agent and an authorized agent's smart device at a decision step 1550. If not, then the lockbox disconnects the short range wireless communications link at a step 1560, and goes back into its sleep mode at a step 1562. On the other hand, if the authentication step shows that the agent and smart device are authorized, then the logic flow is directed to a decision step 1552.

The lockbox also must verify the access credentials before opening its secure compartment. This occurs at decision step 1552. Some electronic lockboxes perform the authorization of the agent and the verification of the access credentials in a single step, while others do it in two separate steps (as illustrated on FIG. 16). In either situation, the agent must be authorized to both "talk" to the lockbox and to access the secure compartment before the lockbox will allow its secure compartment to be opened.

If the access credentials analysis procedure fails at step 1552, then the lockbox again disconnects its short range wireless communication circuit at step 1560 and goes back to sleep at step 1562. On the other hand if the access credentials pass muster, the lockbox will open its key compartment at a step 1554.

In some electronic lockbox systems, after the agent sends credentials to the lockbox a separate request (or command) to access the lockbox also needs to be sent. If that is the case in a particular system, then a step 1528 will send that request/command message to the lockbox. That is part of the verification of the access credentials decision step 1552 that must be evaluated by the lockbox. Assuming everything is normal and the authorization procedures pass muster, the lockbox in many systems will send a message back to the agent's smart device to inform that smart device that the key compartment access has been approved and that the key compartment will be opened. That communication can occur by sending a quick data packet from the lockbox to the agent's smart device. The agent's smart device will recognize this circumstance at a step 1530, and it will then attempt to connect to the central computer and then send the lockbox identification code to the central computer. It will be understood that all of the functions listed in the flow chart steps 1526, 1528, and 1530 can occur in a single logical procedure, if desired, depending upon the system designer's choice for that lockbox operating system and for the software written for the agent's APP.

The above GPS data sent by the prospect's smart device is received at the central computer at a step 1580, and the central computer now waits to receive lockbox identification information from the agent at a step 1582. Assuming these two messages (for steps 1580 and 1582) are received at approximately the same time, which is determined by a decision step 1584, then the logic flow is directed to a decision step 1588 that determines whether or not the GPS coordinates sent by the prospect's smart device are approximately the same as the GPS coordinates that have been established for this lockbox. If not, then the routine ends here at a step 1586.

On the other hand, if decision step 1584 determines that the GPS coordinates are approximately the same, then the central computer logs the agent's and prospect's activities at a step 1590. The phrase "approximately the same GPS coordinates" can be adjusted to provide a tolerance of, for example, 50 feet in any horizontal direction, to meet this criterion.

After the central computer has received and analyzed the lockbox identifier messages from both the prospect and the agent, and after it has logged this activity, the central computer will now notify the agent and the prospect that contextual data is available for this lockbox, at a step 1592. (This function or step depends, of course, on there actually being contextual data available for that specific lockbox.) After sending the lockbox identifier to the central computer, both smart devices for the agent and the prospect are now waiting for "notification" from the central computer. Otherwise the smart devices would have to be more or less pinging periodically to see if information has been received from the central computer.

The notification message sent by the central computer at step 1592 can be received at the prospect's smart device at a step 1510 and at the agent's smart device at a step 1532. Both smart devices have a decision step 1512 or 1534 to analyze whether or not a notification has been received, and if the answer is YES, then both are ready to receive contextual data from the central computer, at a step 1514 or 1536, respectively. The central computer sends the contextual data to both devices at a step 1594. The central computer has now completed this routine and returns to other functions at a step 1596.

At this stage in the logic, both smart devices can now perform other APP functions at a step 1516 or a step 1532, respectively, for the prospect's smart device and the agent's smart device. These other APP functions include displaying the contextual data in various formats, as controlled by user inputs and by the APP functions.

With regard to the lockbox, once it has opened its key compartment at step 1554, it logs the time and date of this event at a step 1556 and then goes back into its sleep mode at a step 1558. For the functions of FIG. 16, the lockbox really did not perform any specific functions with regard to contextual data.

Control Logic for Sales Prospect to Login to Central Computer

Figure 17:
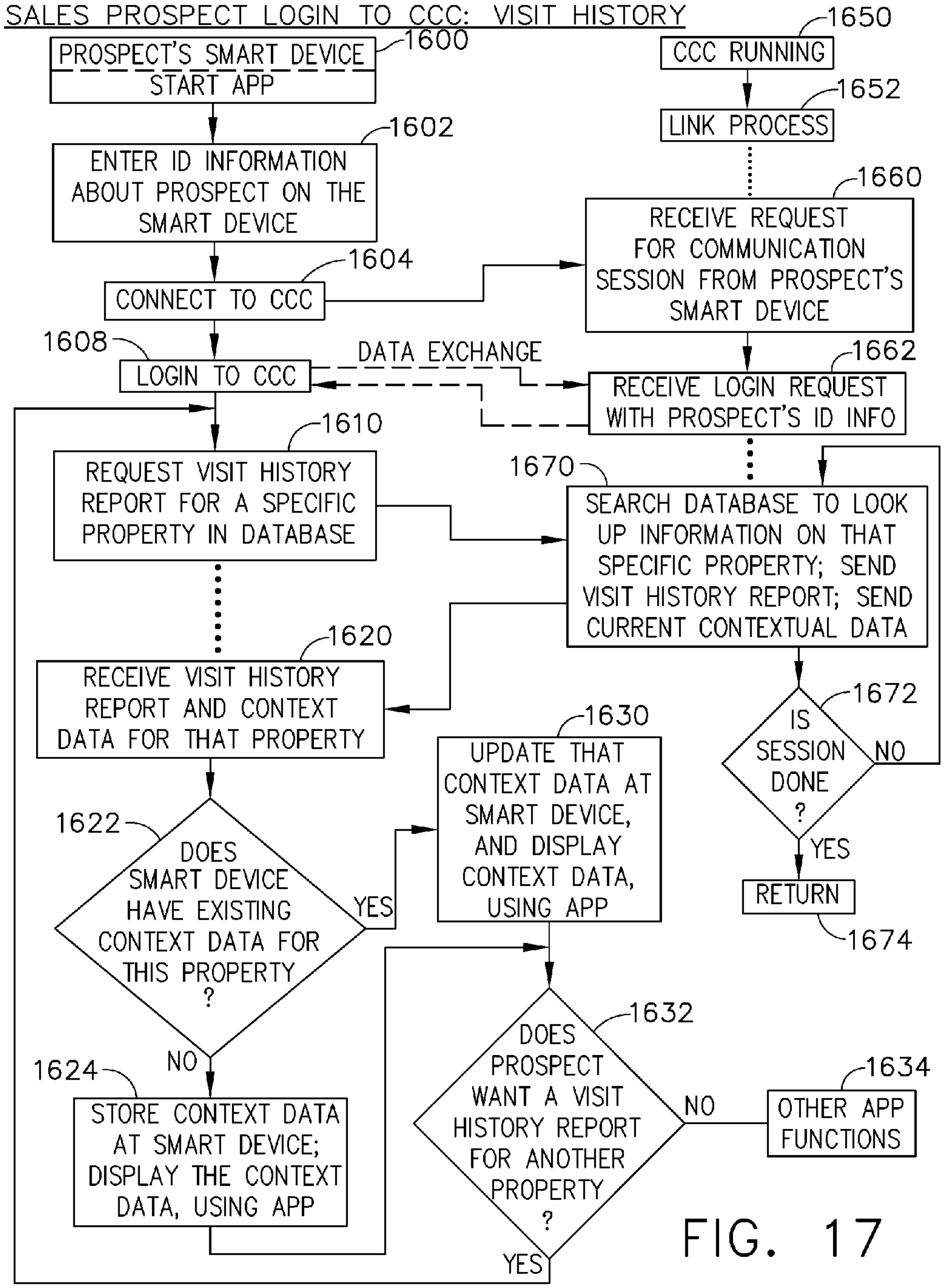
FIG. 17 is a flow chart of some of the steps executed by an electronic lockbox system to perform a routine that allows a sales prospect to log in to the central computer to obtain a visit history report and contextual data.

Referring now to FIG. 17, a flow chart is provided to show some of the important steps in a routine that allows a sales prospect to obtain a visit history from the central computer, using a specific login procedure. Beginning at a step 1600, the sales prospect starts an APP on his or her smart device. The prospect enters identification information about himself or herself into the smart device memory at a step 1602. After that has been accomplished, the prospect attempts to connect to the central computer at a step 1604.

In a parallel set of logic, the central computer is always presumed to be running and it is described as doing such on FIG. 17 at a step 1650. Since the central computer more or less makes its living by talking to other devices, it undergoes a link process at a step 1652. After receiving a request for a communication session from the prospect's smart device at a step 1660, the central computer will begin a data exchange that will allow the prospect to attempt to login.

After initially connecting to the central computer at step 1604, the prospect will use his or her smart device to attempt to login to the central computer at a step 1608. The central computer receives this login request at a step 1662, and also receives the prospect's identification information. A data exchange ensues between steps 1608 and 1662, and assuming everything is in order, the prospect has now logged into the central computer. Of course, the prospect is not a sales agent, and thus has only limited functionality with regard to what the prospect can see or do at the central computer's software operating system.

The prospect now requests a visit history report for a specific property in the central computer's database, at a step 1610. The central computer receives this request at a step 1670 and now searches its database to look up information on that specific property. The central computer now sends the visit history report, and can send current contextual data for that specific property as well. The sales prospect now receives the visit history report and also the contextual data for that property at a step 1620.

The smart device of the prospect now determines whether or not his or her smart device has existing contextual data for this property at a decision step 1622. If not, then a step 1624 stores that contextual data just received into the smart device's memory circuit, and displays the contextual data using the APP's functions. On the other hand, if the prospect's smart device already has existing contextual data for that same property, then a step 1630 will update that contextual data at the smart device, and will display this updated version of contextual data, again using the APP.

After the prospect has finished reviewing the contextual data, the smart device asks whether or not the prospect wants to receive a visit history report for a different property, at a decision step 1632. If not, then the APP will perform other functions at a step 1634. On the other hand, if the prospect desires a visit history report for another property, then the logic flow is directed back to step 1610 where the smart device requests a visit history report for a different specific property in the central computer's database.

With regard to the central computer's operational logic, after searching its database and sending contextual data to the prospect at step 1670, the central computer determines whether or not the communications session is done at a decision step 1672. If so, then the central computer returns to other operating functions at a step 1674.

Control Logic to Create or Update an Agent-Prospect Database

Figure 18:
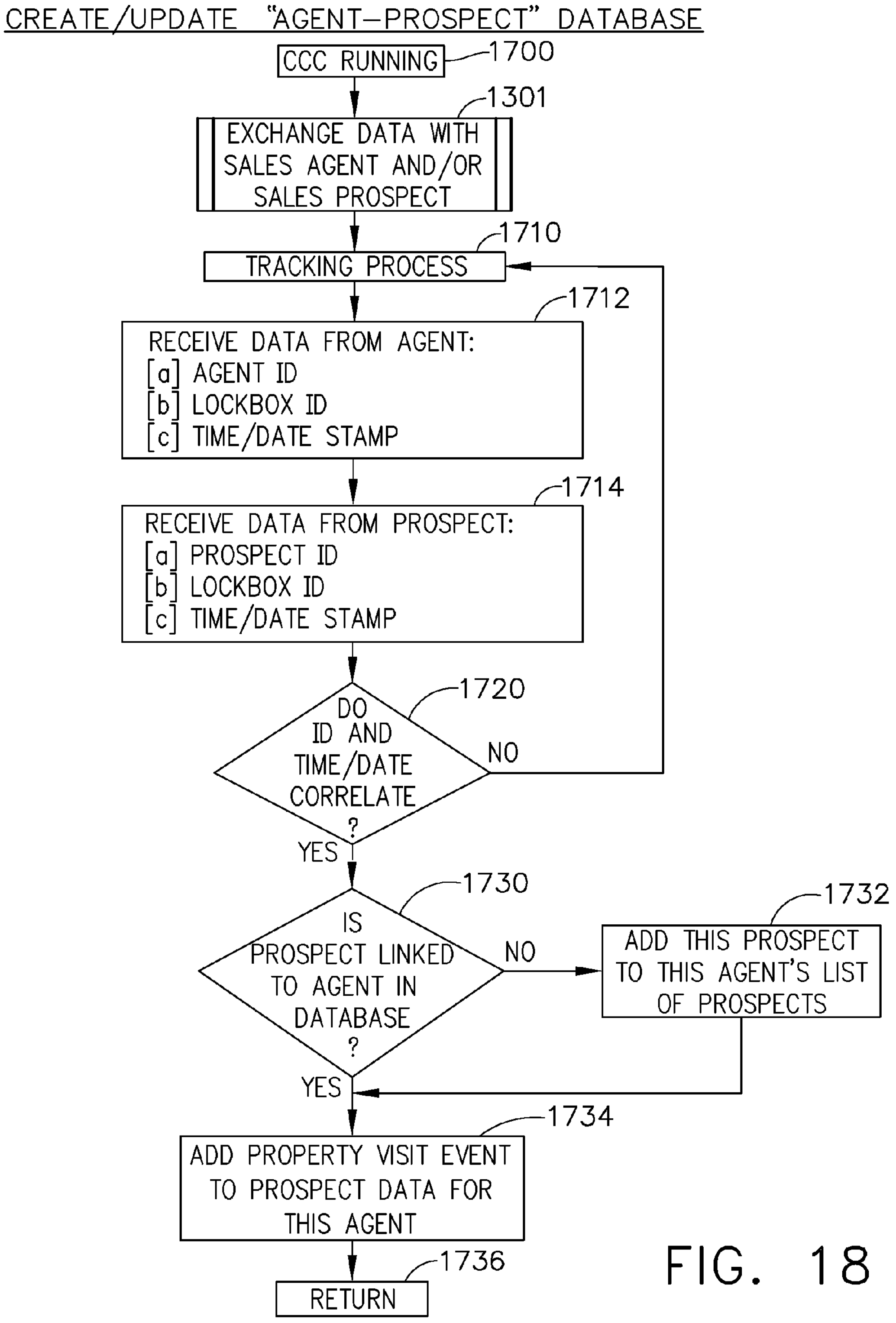
FIG. 18 is a flow chart of some of the steps executed by an electronic lockbox system to perform a routine to create or update an "agent-prospect" database.

Referring now to FIG. 18, a flow chart is provided to show some of the important steps in a routine at the central computer that allows the creation of an agent-prospect database, or will update that database. Beginning at a step 1700, the central computer is assumed to be running. The central computer now desires to exchange data with the sales agent and the sales prospect, or at least one of those two persons. This occurs at a sub-routine generally designated by the numeral 1301, which was illustrated as a flow chart on FIG. 14. Most or all of those functional steps occur in this sub-routine function block on FIG. 18.

The central computer now begins a new routine referred to as a "tracking process," which occurs at a step 1710. First the central computer receives data from the agent, including the agent's identification, the lockbox identification, and a time/date stamp for accessing the lockbox. This occurs at a step 1712. Similarly, the central computer receives data from the prospect which includes: identification information of the prospect, lockbox identification information, and a time/date stamp for receiving the communications message from that prospect. This occurs at a step 1714.

The central computer now determines at a decision step 1720 whether or not the identification information and the time/date stamps correlate between the two messages received from the two different persons, i.e., the agent and the prospect, at steps 1712 and 1714, respectively. If not, then the logic flow is directed back to the initial portion of the tracking process step 1710. If this information does correlate, then the logic flow is directed to a decision step 1730 that determines whether or not the prospect has already been linked to the agent and the central computer's database. If not, then the central computer adds this prospect to this agent's list of prospects, at a step 1732.

On the other hand, if the prospect was already linked to the agent, then a step 1734 is used to add the property visit event information to this prospect's data for this agent. This step 1734 takes place in both paths of the logic flow leading from decision step 1730. The events occurring at step 1734 are used to create a database that will be used as part of the visit history reports that can later be requested either by the agent or by the prospect. Once this event information has been added to the database, this routine is finished and the central computer returns to other functions at a step 1736.

Lockbox with Wireless Communications to More than One Smart Device

Figure 19:
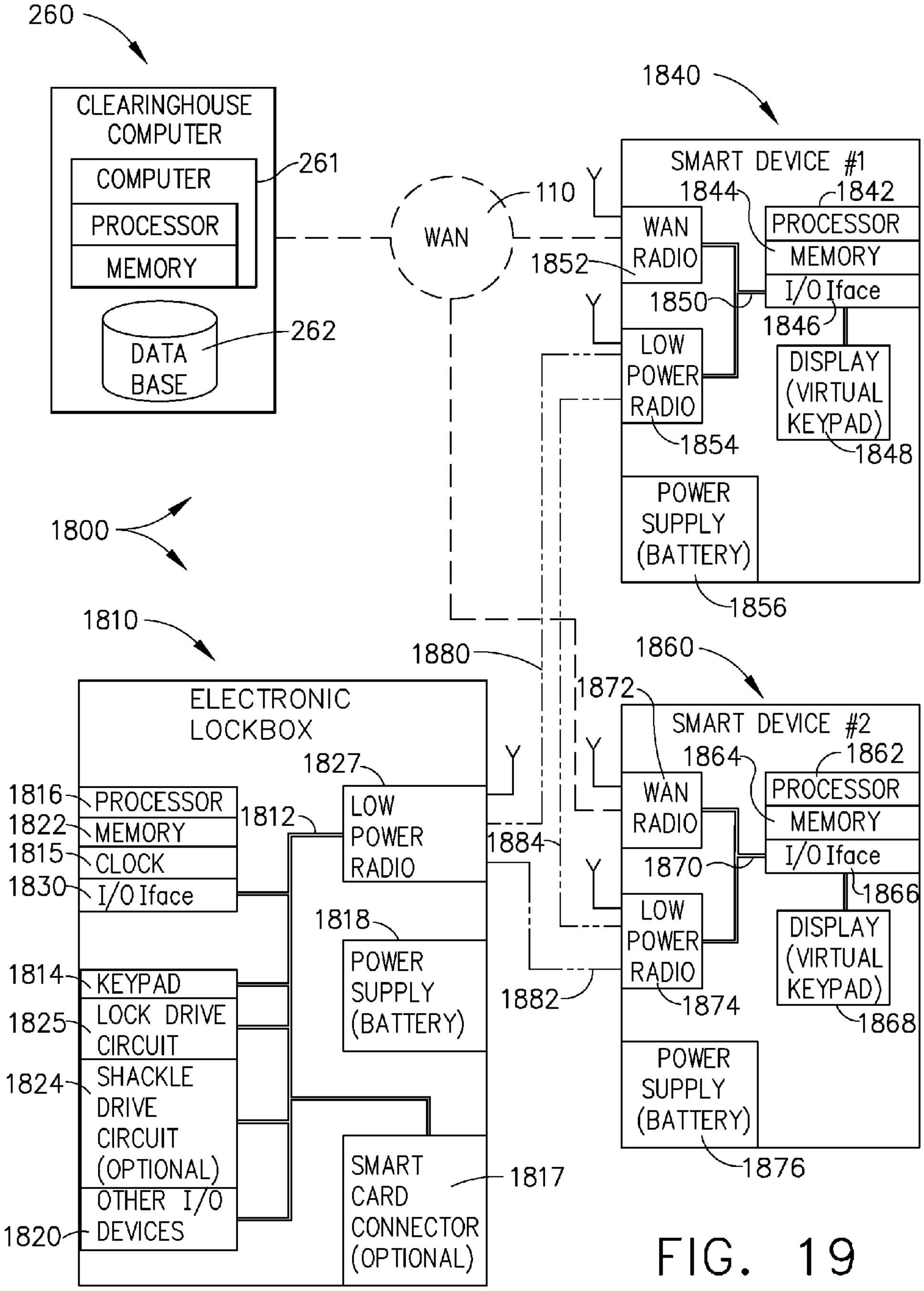
FIG. 19 is a diagrammatic view of the major components of a third embodiment of an electronic lockbox security system, including a central computer station, a first wireless portable computer (Smart Device #1), a second wireless portable computer (Smart Device #2), and a portable electronic lockbox apparatus such as that depicted in FIG. 3.

Referring now to FIG. 19, a third embodiment electronic lockbox system, generally designated by the reference numeral 1800, is depicted. The system 1800 includes one or more electronic lockboxes 1810, a central clearinghouse computer system 260 (also referred to as a "CCC"), a first wireless data communications system 110 that comprises a wide area network, and two wireless smart devices 1840 and 1860. The central clearinghouse computer 260 typically will include a database 262 containing a repository of electronic lockbox identification and attribute information, and also contains a repository of information about real estate agents. A computer 261 controls the database 262, and includes a processing circuit and a memory circuit, as well as other typical devices that are part of a computing center, including many WAN communications lines to talk with multiple users, virtually simultaneously.

Assuming that FIG. 19 represents a real estate lockbox system, then electronic lockbox 1810 would typically include a shackle. Therefore, this lockbox would contain a processing circuit 1816, a memory circuit 1822, a calendar-type clock circuit 1815, and some type of input/output interface circuit 1830. An interface or data bus 1812 would be used to communicate from the I/O interface circuit 1830 to the various input/output devices that are mounted on or included with the electronic lockbox 1810. This would include a keypad 1814, a lock drive circuit 1825, a shackle drive circuit 1824 (which could be optional for various types of applications), as well as many other input/output devices, generally designated by the reference numeral 1820. Several such "other input/output devices" are illustrated on FIG. 4, which depicts a relatively standard electronic lockbox of the type that could be used in this system of FIG. 19.

The electronic lockbox 1810 also includes a low power radio 1827 (which could be a different type of wireless device than a radio, for example, an optical wireless communications device), a smart card connector 1817 (which is optional, again depending upon the exact application for this system), and a power supply 1818, which typically would be a battery. This lockbox could also contain a backup capacitor if desired.

The first smart device 1840 would include a processing circuit 1842, a memory circuit 1844, and an input/output interface circuit 1846, as well as a display 1848. One typical smart device that could be used would be a smart phone, and most smart phones have a touch screen display, which can act as a virtual keypad. Some type of user input device will be necessary, so if a virtual keypad is not part of the display 1848, then some other type of input keypad or at least a numeric keypad (such as a telephone keypad) would be needed. Smart device 1840 will also have a signal or data bus 1850 that transfers signals from the I/O interface 1846 to a wide area network radio 1852, and a low power radio 1854. The smart device would also contain some type of electrical power supply 1856, such as a battery.

The second smart device 1860 will also contain similar circuitry, including a processing circuit 1862, a memory circuit 1864, and I/O interface circuit 1866, and a display 1868 (which could include a virtual keypad). This smart device will also have a signal or data bus 1870 that connects the I/O interface to a wide area network radio 1872 and a low power radio 1874. The second smart device would also include an electrical power supply 1876.

If the first and second smart devices 1840 and 1860 are both smart phones, then their wide area radios 1852 and 1872 would essentially be cellular telephones, and could connect to the wide area network 110, typically via some type of cellular tower. The clearinghouse computer 260 would also be able to connect into the cellular tower network via the Internet in most situations.

There is a second wireless communications network on FIG. 19. This would not be a wide area network, but it would involve the low power radios of the lockbox 1827, and the low power radios 1854 and 1874 of the smart devices 1840 and 1860. FIG. 19 diagrammatically shows how the two smart devices can communicate with each other and with the electronic lockbox, using communication pathways 1180, 1882, and 1884. These "pathways" are of course not hardware pathways, but they comprise some type of wireless communication protocols, and in today's technology, these typically would either be radio circuits or optical circuits that use electromagnetic waves as the communication media. One typical protocol would be Bluetooth, and so long as both smart devices 1840 and 1860 are in close enough proximity to the electronic lockbox 1810, then all three low power radio circuits can communicate with each other, as desired. The methodologies for exemplary situations in which these devices can be used with an electronic lockbox were described above, in reference to the flow charts of FIGS. 11-18.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

In addition, it should be understood that embodiments disclosed herein include both hardware and electronic components or modules that, for purposes of discussion, may be illustrated and described as if the majority of the components were implemented solely in hardware.

However, one of ordinary skill in the art, and based on a reading of this detailed description, would recognize that, in at least one embodiment, the electronic based aspects of the technology disclosed herein may be implemented in software. As such, it should be noted that a plurality of hardware and software-based devices, as well as a plurality of different structural components may be utilized to implement the technology disclosed herein.

Some additional information about "basic" lockbox embodiments, including advanced features, are more fully described in earlier patent documents by the same inventor, and assigned to SentriLock, Inc. or SentriLock LLC, including: U.S. Pat. No. 7,009,489, issued Mar. 7, 2006, for ELECTRONIC LOCK SYSTEM AND METHOD FOR ITS USE; U.S. Pat. No. 6,989,732, issued Jan. 24, 2006, for ELECTRONIC LOCK SYSTEM AND METHOD FOR ITS USE WITH CARD ONLY MODE; U.S. Pat. No. 7,086,258, issued Aug. 8, 2006, for ELECTRONIC LOCK BOX WITH SINGLE LINEAR ACTUATOR OPERATING TWO DIFFERENT LATCHING MECHANISMS; U.S. Pat. No. 7,420,456, issued Sep. 2, 2008, for ELECTRONIC LOCK BOX WITH MULTIPLE MODES AND SECURITY STATES; U.S. Pat. No. 7,193,503, issued Mar. 20, 2007, for ELECTRONIC LOCK SYSTEM AND METHOD FOR ITS USE WITH A SECURE MEMORY CARD; U.S. Pat. No. 7,999,656, issued Aug. 16, 2011, for ELECTRONIC LOCK BOX WITH KEY PRESENCE SENSING; U.S. Pat. No. 7,734,068, issued Jun. 8, 2010, for ELECTRONIC LOCK BOX USING A BIOMETRIC IDENTIFICATION DEVICE; U.S. Pat. No. 8,451,088, issued May 28, 2013, for ELECTRONIC LOCK BOX WITH TRANSPONDER BASED COMMUNICATIONS; U.S. Pat. No. 8,164,419, issued Apr. 24, 2012, for ELECTRONIC LOCK BOX WITH TIME-RELATED DATA ENCRYPTION BASED ON USER-SELECTED PIN; U.S. Pat. No. 8,151,608, issued Apr. 10, 2012, for ELECTRONIC LOCK BOX WITH MECHANISM IMMOBILIZER FEATURES; U.S. patent application Ser. No. 12/756,741, filed on Apr. 8, 2010 (Publication No. US 2011/0251876), for ELECTRONIC LOCK BOX SYSTEM WITH INCENTIVIZED FEEDBACK; U.S. Pat. No. 8,593,252, issued Nov. 26, 2013, for ELECTRONIC LOCK BOX PROXIMITY ACCESS CONTROL; U.S. Pat. No. 8,912,884, issued Dec. 16, 2014, for ELECTRONIC KEY LOCKOUT CONTROL IN LOCKBOX SYSTEM; and U.S. patent application Ser. No. 13/830,024, filed on Mar. 14, 2013 (Publication No. US 2014/0266586), for CONTEXTUAL DATA DELIVERY TO MOBILE USERS RESPONSIVE TO ACCESS OF AN ELECTRONIC LOCKBOX. These patent documents are incorporated by reference herein, in their entirety.

All documents cited in the Background and in the Detailed Description are, in relevant part, incorporated herein by reference; the citation of any document is not to be construed as an admission that it is prior art with respect to the technology disclosed herein.

It will be understood that the logical operations described in relation to the flow charts of FIGS. 7-18 can be implemented using sequential logic (such as by using microprocessor technology), or using a logic state machine, or perhaps by discrete logic; it even could be implemented using parallel processors. One preferred embodiment may use a microprocessor or microcontroller (e.g., the processor 16) to execute software instructions that are stored in memory cells within an ASIC. In fact, an entire microprocessor (or microcontroller, for that matter), along with RAM and executable ROM, may be contained within a single ASIC, in one mode of the technology disclosed herein. Of course, other types of circuitry could be used to implement these logical operations depicted in the drawings without departing from the principles of the technology disclosed herein. In any event, some type of processing circuit will be provided, whether it is based on a microprocessor, a logic state machine, by using discrete logic elements to accomplish these tasks, or perhaps by a type of computation device not yet invented; moreover, some type of memory circuit will be provided, whether it is based on typical RAM chips, EEROM chips (including Flash memory), by using discrete logic elements to store data and other operating information, or perhaps by a type of memory device not yet invented.

It will also be understood that the precise logical operations depicted in the flow charts of FIGS. 7-18, and discussed above, could be somewhat modified to perform similar, although not exact, functions without departing from the principles of the technology disclosed herein. The exact nature of some of the decision steps and other commands in these flow charts are directed toward specific future models of lockbox systems (those involving lockboxes sold by SentriLock, LLC, for example) and certainly similar, but somewhat different, steps would be taken for use with other models or brands of lockbox systems in many instances, with the overall inventive results being the same.

It will further be understood that the term "portable communications device," as used herein, typically refers to electronic communications equipment that can communicate with an electronic lockbox using a low power radio or optical communication circuit, under the control of a proper APP computer program. In some cases, such a portable communications device refers to electronic communications equipment that also is able to use a cellular telephone link to communicate with a wide area network. A typical portable communications device is also known as a "smart device." A smart device that is to be used by a sales agent (as opposed to a sales prospect) could perhaps be replaced by an "electronic key" used with electronic lockboxes, so long as that electronic key includes the necessary cellular telephone link and low power communication circuit, and has a computer program installed to allow it to function in the manner as described above. In other words, both types of devices ("electronic key" and "smart device") require software to function properly; in the case of a smart device (or "smart phone"), that software is typically called an "APP" whereas in the case of an electronic key, that software can be referred to simply as executable code, or as an executable computer program (for example, a "*.exe" file used in a Windows-based operating system).

As used herein, the term "proximal" can have a meaning of closely positioning one physical object with a second physical object, such that the two objects are perhaps adjacent to one another, although it is not necessarily required that there be no third object positioned therebetween. In the technology disclosed herein, there may be instances in which a "male locating structure" is to be positioned "proximal" to a "female locating structure." In general, this could mean that the two male and female structures are to be physically abutting one another, or this could mean that they are "mated" to one another by way of a particular size and shape that essentially keeps one structure oriented in a predetermined direction and at an X-Y (e.g., horizontal and vertical) position with respect to one another, regardless as to whether the two male and female structures actually touch one another along a continuous surface. Or, two structures of any size and shape (whether male, female, or otherwise in shape) may be located somewhat near one another, regardless if they physically abut one another or not; such a relationship could still be termed "proximal." Or, two or more possible locations for a particular point can be specified in relation to a precise attribute of a physical object, such as being "near" or "at" the end of a stick; all of those possible near/at locations could be deemed "proximal" to the end of that stick. Moreover, the term "proximal" can also have a meaning that relates strictly to a single object, in which the single object may have two ends, and the "distal end" is the end that is positioned somewhat farther away from a subject point (or area) of reference, and the "proximal end" is the other end, which would be positioned somewhat closer to that same subject point (or area) of reference.

It will be understood that the various components that are described and/or illustrated herein can be fabricated in various ways, including in multiple parts or as a unitary part for each of these components, without departing from the principles of the technology disclosed herein. For example, a component that is included as a recited element of a claim hereinbelow may be fabricated as a unitary part; or that component may be fabricated as a combined structure of several individual parts that are assembled together. But that "multi-part component" will still fall within the scope of the claimed, recited element for infringement purposes of claim interpretation, even if it appears that the claimed, recited element is described and illustrated herein only as a unitary structure.

The foregoing description of a preferred embodiment has been presented for purposes of illustration and description. It is not intended to be exhaustive or to limit the technology disclosed herein to the precise form disclosed, and the technology disclosed herein may be further modified within the spirit and scope of this disclosure. Any examples described or illustrated herein are intended as non-limiting examples, and many modifications or variations of the examples, or of the preferred embodiment(s), are possible in light of the above teachings, without departing from the spirit and scope of the technology disclosed herein. The embodiment(s) was chosen and described in order to illustrate the principles of the technology disclosed herein and its practical application to thereby enable one of ordinary skill in the art to utilize the technology disclosed herein in various embodiments and with various modifications as are suited to particular uses contemplated. This application is therefore intended to cover any variations, uses, or adaptations of the technology disclosed herein using its general principles. Further, this application is intended to cover such departures from the present disclosure as come within known or customary practice in the art to which this technology disclosed herein pertains and which fall within the limits of the appended claims.

What is claimed is:

1. An electronic lockbox system, said system comprising:

(a) a first electronic lockbox, said first electronic lockbox having a first processing circuit, a first memory circuit, a first short range wireless communications circuit, and a secure compartment having a movable opening element that is under the control of said first processing circuit, wherein said first electronic lockbox is assigned to a first specific property;

(b) a first portable communications device having a second processing circuit, a second memory circuit, a first display, a first data entry circuit, a second short range wireless communications circuit, and a first WAN communications circuit for communicating with a wide area network, said first portable communications device being assigned to a sales agent;

(c) a central computer having a third processing circuit, a third memory circuit containing at least one database, and a second WAN communications circuit for communicating with said wide area network, wherein said at least one database includes a first database having a plurality of entries that store contextual data pertaining to at least one property in said electronic lockbox system; and (d) a second portable communications device having a fourth processing circuit, a fourth memory circuit, a second display, a second data entry circuit, a GPS receiver circuit, and a third WAN communications circuit for communicating with a wide area network, said second portable communications device being assigned to a sales prospect;

wherein said first, second, third, and fourth processing circuits are programmed with computer code to perform functions of:

(i) at said first electronic lockbox, granting access to said secure compartment if a sales agent correctly performs an authorized access procedure;

(ii) at said first electronic lockbox, using said first short range wireless communications circuit and said second short range wireless communications circuit, sending a first message that is received by said first portable communications device, said first message containing access event information pertaining to said first electronic lockbox;

(iii) at said first portable communications device, using said first WAN communications circuit and said second WAN communications circuit, sending a second message that is received by said central computer, said second message containing access event information pertaining to said first electronic lockbox;

(iv) at said second portable communications device, using said third WAN communications circuit and said second WAN communications circuit, sending a third message that is received by said central computer, said third message containing GPS coordinates information that specifies an approximate physical location of said second portable communications device;

(v) at said central computer, determining if said approximate physical location of said second portable communications device corresponds to a physical location of said first electronic lockbox, and if so, then;

(vi) at said central computer, using said second WAN communications circuit and said third WAN communications circuit, sending a fourth message that is received by said second portable communications device, said fourth message containing contextual data pertaining to said first specific property.

2. The system of claim 1, wherein said first and third processing circuits are programmed with computer code to perform further functions of:

(a) at said central computer, using said second WAN communications circuit and said first WAN communications circuit, sending a fifth message that is received by said first portable communications device, said fifth message containing the same contextual data that was sent in said fourth message.

3. The system of claim 1, wherein said first and third processing circuits are programmed with computer code to perform further functions of:

(a) at said central computer, using said second WAN communications circuit and said first WAN communications circuit, sending a fifth message that is received by said first portable communications device, said fifth message containing different contextual data from that sent in said fourth message, but still pertaining to said first specific property.

4. An electronic lockbox system, said system comprising:

(a) a first electronic lockbox, said first electronic lockbox having a first processing circuit, a first memory circuit, a first short range wireless communications circuit, and a secure compartment having a movable opening element that is under the control of said first processing circuit, wherein said first electronic lockbox is assigned to a first specific property;

(b) a first portable communications device having a second processing circuit, a second memory circuit, a first display, a first data entry circuit, a second short range wireless communications circuit, and a first WAN communications circuit for communicating with a wide area network, said first portable communications device being assigned to a sales agent;

(c) a central computer having a third processing circuit, a third memory circuit containing at least one database, and a second WAN communications circuit for communicating with said wide area network, wherein said at least one database includes a first database having a plurality of entries that store contextual data pertaining to at least one property in said electronic lockbox system; and (d) a second portable communications device having a fourth processing circuit, a fourth memory circuit, a second display, a second data entry circuit, a third short range wireless communications circuit, and a third WAN communications circuit for communicating with a wide area network, said second portable communications device being assigned to a sales prospect;

wherein said first, second, third, and fourth processing circuits are programmed with computer code to perform functions of:

(i) activating said first electronic lockbox by an action performed by at least one of: (A) said sales agent and (B) said sales prospect;

(ii) using said first short range wireless communications circuit of said first electronic lockbox, sending a first message containing first unique identification information pertaining to said first electronic lockbox;

(iii) at said first portable communications device, allowing said sales agent to login to said central computer, using said first WAN communications circuit and said second WAN communications circuit;

(iv) after receiving said first message at said second short range wireless communications circuit of said first portable communications device, using said first WAN communications circuit and said second WAN communications circuit to send a second message to said central computer, said second message containing said first unique identification information pertaining to said first electronic lockbox and identification information pertaining to said sales agent;

(v) after receiving said first message at said third short range wireless communications circuit of said second portable communications device, using said third WAN communications circuit and said second WAN communications circuit to send a third message to said central computer, said third message containing said first unique identification information pertaining to said first electronic lockbox;

(vi) after receiving said second and third messages at said central computer, using said second WAN communications circuit and said third WAN communications circuit to send a fourth message to said second portable communications device, said fourth message containing contextual data pertaining to said first specific property.

5. The system of claim 4, wherein said first and third processing circuits are programmed with computer code to perform further functions of:

(a) at said central computer, using said second WAN communications circuit and said first WAN communications circuit, sending a fifth message that is received by said first portable communications device, said fifth message containing the same contextual data that was sent in said fourth message.

6. The system of claim 4, wherein said first and third processing circuits are programmed with computer code to perform further functions of:

(a) at said central computer, using said second WAN communications circuit and said first WAN communications circuit, sending a fifth message that is received by said first portable communications device, said fifth message containing different contextual data from that sent in said fourth message, but still pertaining to said first specific property.

7. The system of claim 4, wherein said first and third processing circuits are programmed with computer code to perform further functions of:

(a) at said central computer, after receiving said second message and said third message, determining, using said third processing circuit, if said second message and said third message both pertain to said first electronic lockbox, and if so;

(b) at said central computer, after receiving said second message and said third message, determining, using said third processing circuit, if said second message and said third message were both received within a predetermined time interval, and if so;

(c) at said central computer, after receiving said second message and said third message, determining, using said third processing circuit, if said sales prospect has been linked to said sales agent in a prospect-agent database of said at least one database:

(i) if so, adding a property visit event to said agent-prospect database for said sales prospect and said sales agent;

(ii) if not, adding said sales prospect to said prospect-agent database for said sales agent to create a link between said sales prospect and said sales agent, and then adding a property visit event to said agent-prospect database for said sales prospect and said sales agent; and (d) at said central computer, thereby automatically maintaining said agent-prospect database of property visits, without user intervention.

8. An electronic lockbox system, said system comprising:

(a) a first electronic lockbox, said first electronic lockbox having a first processing circuit, a first memory circuit, a first short range wireless communications circuit, and a secure compartment having a movable opening element that is under the control of said first processing circuit, wherein said first electronic lockbox is assigned to a first specific property;

(b) a first portable communications device having a second processing circuit, a second memory circuit, a first display, a first data entry circuit, a second short range wireless communications circuit, and a first WAN communications circuit for communicating with a wide area network, said first portable communications device being assigned to an authorized user;

(c) a central computer having a third processing circuit, a third memory circuit containing at least one database, and a second WAN communications circuit for communicating with said wide area network, wherein said at least one database includes a first database having a plurality of entries that store contextual data pertaining to at least one property in said electronic lockbox system; and (d) a second portable communications device having a fourth processing circuit, a fourth memory circuit, a second display, a second data entry circuit, a third short range wireless communications circuit, and a third WAN communications circuit for communicating with a wide area network, said second portable communications device being assigned to a second person;

wherein said first, second, and fourth processing circuits are programmed with computer code to perform functions of:

(i) activating said at least one electronic lockbox by an action performed by at least one of: (A) said authorized user and (B) said second person;

(ii) at said first electronic lockbox, using said first short range wireless communications circuit and said second short range wireless communications circuit, sending a first message that is received by said first portable communications device, said first message containing first unique identification information pertaining to said first electronic lockbox;

(iii) at said first portable communications device, using said second short range wireless communications circuit and said third short range wireless communications circuit, and based upon said first unique identification information, sending a second message that is received by said second portable communications device, said second message containing contextual data pertaining to said first specific property; and (iv) at said second portable communications device, after receiving said second message, then generating visual information on said second display, wherein said visual information pertains to said first specific property.

9. The system of claim 8, wherein said second and third processing circuits are programmed with computer code to perform further functions of:

(a) at said first portable communications device, allowing said authorized user to login to said central computer, using said first WAN communications circuit and said second WAN communications circuit;

(b) at said central computer, based upon a request by said authorized user for contextual data pertaining to said first specific property, and before sending said second message, sending a third message from said central computer to said first portable communications device, using said second WAN communications circuit and said first WAN communications circuit, said third message containing said contextual data pertaining to said first specific property; and (c) at said first portable communications device, after receiving said third message, then sending, in near real time, said second message.

10. The system of claim 8, wherein said second processing circuit is programmed with computer code to perform further functions of:

(a) at said first portable communications device, prestoring contextual data pertaining to said first specific property in said second memory circuit;

(b) later, after receiving said first message, then sending, in near real time, said second message.

11. The system of claim 8, wherein said authorized user has the ability to access the secure compartment of said first electronic lockbox.

12. The system of claim 8, wherein said authorized user comprises a sales agent, and said second person comprises a sales prospect.

13. An electronic lockbox system, said system comprising:

(a) a plurality of electronic lockboxes, at least two of said electronic lockboxes having a first processing circuit, a first memory circuit, a first short range wireless communications circuit, and a secure compartment having a movable opening element that is under the control of said first processing circuit, wherein a first one of said plurality of electronic lockboxes is assigned to a first specific property, and wherein a second one of said plurality of electronic lockboxes is assigned to a second specific property;

(b) a first portable communications device having a second processing circuit, a second memory circuit, a first display, a first data entry circuit, a second short range wireless communications circuit, and a first WAN communications circuit for communicating with a wide area network, said first portable communications device being assigned to a sales prospect who is not authorized to access a secure compartment of said plurality of electronic lockboxes;

(c) a central computer having a third processing circuit, a third memory circuit containing at least one database, and a second WAN communications circuit for communicating with said wide area network, wherein said at least one database includes a first database having a plurality of entries that store visit history reports and contextual data pertaining to properties in said electronic lockbox system, including at least said first specific property and said second specific property;

wherein said first, second, and third processing circuits are programmed with computer code to perform functions of:

(i) at said first portable communications device, allowing said sales prospect to login to said central computer, using said first WAN communications circuit and said second WAN communications circuit;

(ii) at said first portable communications device, allowing said sales prospect to request a visit history report pertaining to property visits for at least one of said first specific property and said second specific property;

(iii) at said central computer, sending a visit history report pertaining to property visit activities of said sales prospect, and sending current contextual data pertaining to the specific properties included in said visit history report to said first portable communications device, using said second WAN communications circuit and said first WAN communications circuit;

(iv) at said first portable communications device, storing said current contextual data received from said central computer in said second memory circuit;

(v) at said first portable communications device, determining if existing contextual data is resident in said second memory circuit for at least one of said first specific property and said second specific property, and if so, then:

(vi) at said first portable communications device, updating said existing contextual data for said at least one of said first specific property and said second specific property.

14. The system of claim 13, wherein the function of updating said existing contextual data for said at least one specific property comprises replacing said existing contextual data with said current contextual data.

15. The system of claim 13, wherein the function of updating said existing contextual data for said at least one specific property comprises appending said existing contextual data.

* * * * *